(12) United States Patent
Ohtsubo et al.

(10) Patent No.: US 8,565,590 B2
(45) Date of Patent: Oct. 22, 2013

(54) IMAGE APPARATUS, IMAGING METHOD AND PROGRAM

(75) Inventors: Shinichi Ohtsubo, Kanagawa (JP); Tsuyoshi Futami, Kanagawa (JP); Atsushi Iwasaki, Kanagawa (JP)

(73) Assignee: Sony Corporation, Tokyo (JP)

(*) Notice: Subject to any disclaimer, the term of this patent is extended or adjusted under 35 U.S.C. 154(b) by 69 days.

(21) Appl. No.: 13/137,774

(22) Filed: Sep. 12, 2011

(65) Prior Publication Data
US 2012/0114320 A1 May 10, 2012

(30) Foreign Application Priority Data
Nov. 2, 2010 (JP) ................................ 2010-246007

(51) Int. Cl.
*G03B 3/00* (2006.01)
*G03B 3/10* (2006.01)

(52) U.S. Cl.
USPC ........................................... 396/89; 396/133

(58) Field of Classification Search
USPC .................. 396/89, 120, 133, 90; 359/696
See application file for complete search history.

(56) References Cited

U.S. PATENT DOCUMENTS
5,345,290 A * 9/1994 Watanabe et al. ............. 396/133

FOREIGN PATENT DOCUMENTS
JP 2009-169013 7/2009

* cited by examiner

*Primary Examiner* — W B Perkey
*Assistant Examiner* — Minh Phan
(74) *Attorney, Agent, or Firm* — Rader, Fishman & Grauer PLLC

(57) ABSTRACT

An imaging apparatus includes: a supplying section configured to supply a driving command for driving at least a portion of a lens in a specific direction to a focal-point adjustment device for changing or adjusting a focal-point distance in accordance with power supplied to the focal-point adjustment device; and an inference section configured to infer a position, at which the lens is located after being driven in accordance with the driving command in the specific direction, on the basis of the driving command supplied to the focal-point adjustment device and on the basis of error information serving as information on an error of a driving quantity by which the lens driven by the focal-point adjustment device is moved.

17 Claims, 14 Drawing Sheets

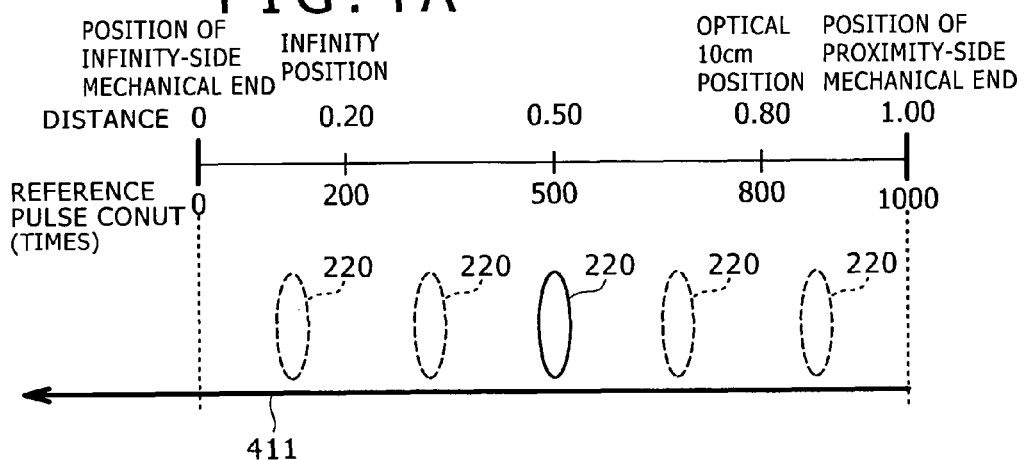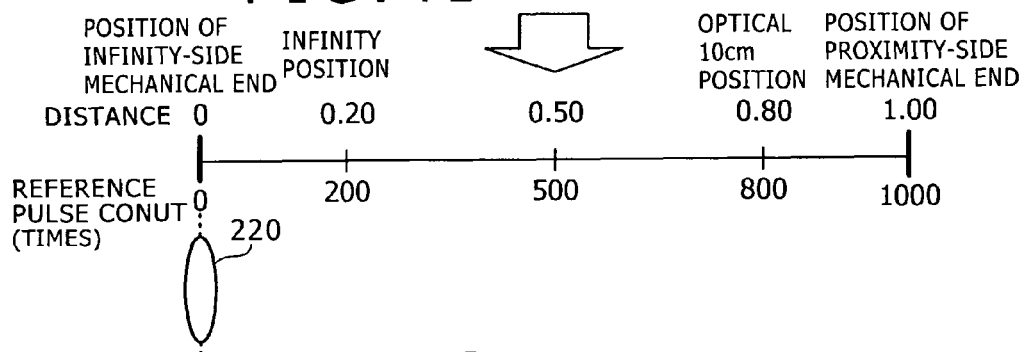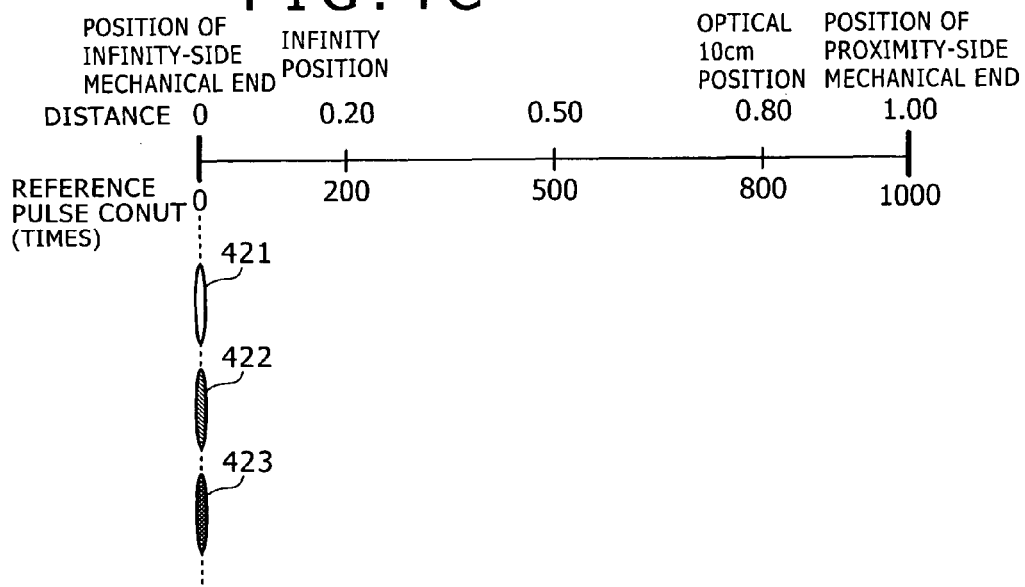

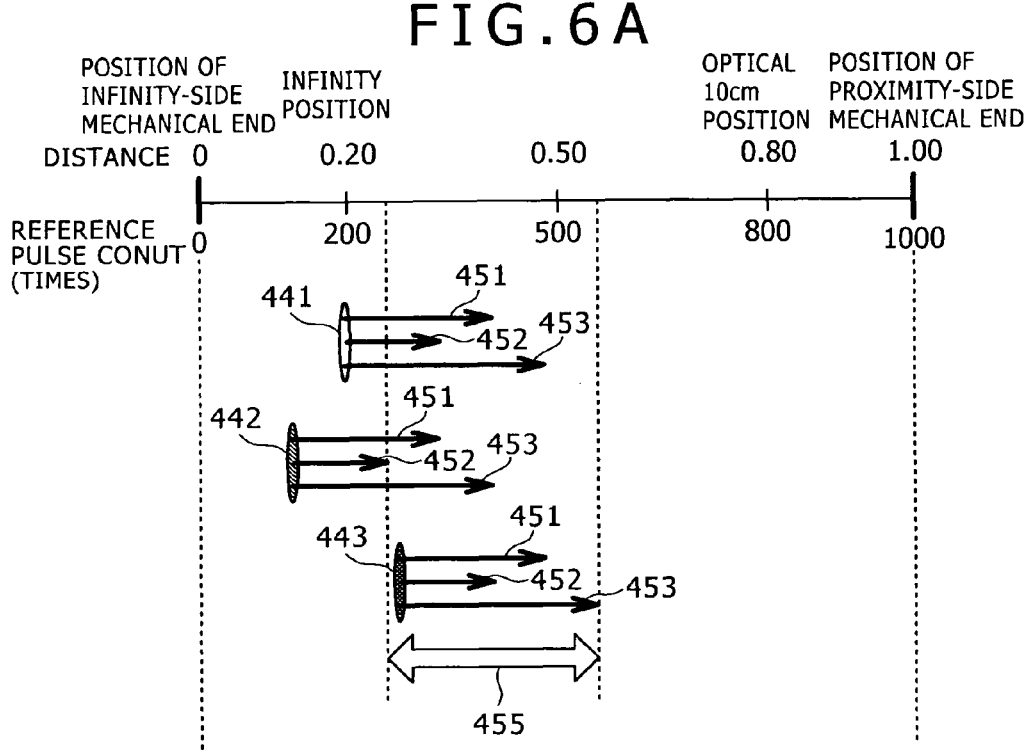
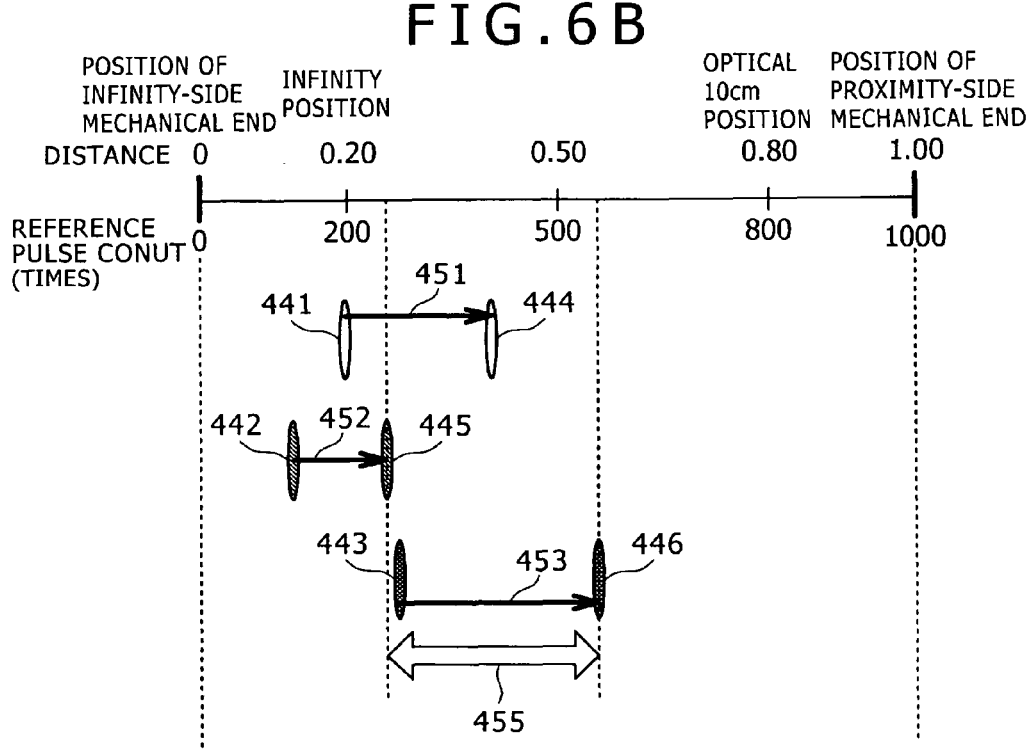

FIG. 8

|  | VIRTUAL POSITION | INFINITY-SIDE ERRONEOUS POSITION | PROXIMITY-SIDE ERRONEOUS POSITION |
|---|---|---|---|
| PULSE-COUNT-BASED MOVEMENT IN PROXIMITY DIRECTION | ADD REQUESTED MOVEMENT QUANTITY | ADD MINIMUM MOVEMENT QUANTITY | ADD MAXIMUM MOVEMENT QUANTITY |
| PULSE-COUNT-BASED MOVEMENT IN INFINITY DIRECTION | SUBTRACT REQUESTED MOVEMENT QUANTITY | SUBTRACT MAXIMUM MOVEMENT QUANTITY | SUBTRACT MINIMUM MOVEMENT QUANTITY |

IMAGE APPARATUS, IMAGING METHOD AND PROGRAM

BACKGROUND

The present disclosure relates to an imaging apparatus. More particularly, the present disclosure relates to an imaging apparatus controlling an operation to drive a lens and also relates to a processing method adopted by the apparatus as well as a program executed by a computer to implement the method.

An imaging apparatus has been becoming popular. A typical example of the imaging apparatus is a digital still camera for taking an image of an imaging object such as a human being by making use of an imaging device, generating the taken image and recording the taken image. In addition, an imaging apparatus having an autofocus function has also been becoming popular too. On top of that, with downsizing of components such as imaging devices and optical-system members, a portable information terminal including any of such imaging devices as a camera module has also been becoming popular as well.

Such a portable information terminal employs an actuator for moving a focus lens in the direction of the optical axis in order to implement the autofocus function. It is desirable to have an actuator that moves the focus lens by a distance linearly proportional to a voltage applied to the actuator. In order to reduce the amount of power consumed by the actuator and the size of the actuator, however, more and more portable information terminals employ an actuator which has a hysteresis characteristic representing a relation between the voltage applied to the actuator and the movement quantity of the focus lens.

If an actuator having a hysteresis characteristic representing a relation between the voltage applied to the actuator and the movement quantity of the focus lens is used, however, an accurate movement quantity cannot be obtained because an error is generated in the movement quantity. In order to solve this problem, a focus control technology has been introduced as a technology for improving precision of positioning the focus lens by compensating the movement quantity for such an error and this focus control technology has been becoming popular. To put it in detail, in the case of an actuator having a hysteresis characteristic, a sensor for detecting the position of the focus lens is provided for carrying out feedback control to adjust the movement quantity. However, the sensor for detecting the position of the focus lens is a hindrance to an effort to reduce the size of the imaging apparatus and raises the cost of the apparatus. For this reason, we have been studying an imaging apparatus employing an actuator having a hysteresis characteristic and making use of no sensor for detecting the position of the focus lens.

For example, there has been proposed an imaging apparatus which controls the position of the focus lens by measuring the position of the focus lens by making use of a counter carrying out a counting operation during the time period to apply a voltage to a piezoelectric device serving as the actuator. For more information on such an imaging device, the reader is advised to refer to documents such as Japanese Patent Laid-open No. 2009-169013.

SUMMARY

In accordance with the related-art technology described above, it is possible to control the position of the focus lens without making use of a sensor for detecting the position of the focus lens.

In the related-art technology described above, however, the hysteresis characteristic of movement quantity of the focus lens is not taken into consideration. The hysteresis characteristic of movement quantity of the focus lens is caused by changes of a usage environment in which the imaging apparatus is used. The changes of the usage environment include changes of the temperature and changes of the imaging posture. Since the hysteresis characteristic is not taken into consideration, a movement-quantity error is generated due to usage environmental changes such as changes of the temperature and changes of the imaging posture. Thus, it is feared that, in accordance with the number of operations to drive the focus lens, there is a discrepancy between the actual position of the focus lens and the position indicating the value of the counter.

In accordance with the related-art technology described above for example, with the initial timing to carry out control to position the focus lens, the focus lens is pressed against a mechanical end in order to reset the position of the focus lens and an accurate position of the focus lens is obtained. The position of the focus lens is reset because the position of the focus lens is assumed to be unknown. Thus, a full stroke is made in order to move the focus lens to a mechanical end.

In order to make such a full stroke, however, it takes much time. Thus, the focus control cannot be carried out in a short period of time. In order to solve this problem, for a configuration in which a sensor for detecting the position of the focus lens is not provided, it is important to carry out the focus control in a short period of time by properly estimating the position of the focus lens by inference.

The present disclosure addresses the problems described above, to properly estimate the position of the focus lens by inference.

In order to solve the problems described above, in accordance with a first embodiment of the present disclosure, there are provided an imaging apparatus, a method for controlling the apparatus and a program to be executed by a computer to implement the method. The imaging apparatus employs:

a supplying section configured to supply a driving command for driving at least a portion of a lens in a specific direction to a focal-point adjustment device for changing or adjusting a focal-point distance in accordance with a power supplied to the focal-point adjustment device; and an inference section configured to infer a position, at which the lens is located after being driven in accordance with the driving command in the specific direction, on the basis of the driving command supplied to the focal-point adjustment device and on the basis of information on an error of a distance by which the lens driven by the focal-point adjustment device is moved.

Thus, the present disclosure brings about a function to infer a position, at which the lens is located after being driven in accordance with the driving command in the specific direction, on the basis of the driving command supplied to the focal-point adjustment device and on the basis of information on an error of a distance by which the lens driven by the focal-point adjustment device is moved.

In addition, in accordance with the first embodiment of the present disclosure, it is also possible to provide a configuration in which the inference section infers a predetermined range including the present position of the lens. Thus, the present disclosure brings about a function to infer a predetermined range including the present position of the lens.

In this configuration, in order to drive the lens to move to any specific one of the two ends of the predetermined range of the movement made by the driven lens, the supplying section may supply the driving command on the basis of the inferred predetermined range and the error information. Thus, the present disclosure brings about a function to supply the driving command on the basis of the inferred predetermined range and the error information in order to drive the lens to move to the specific end of a driving range of the lens.

In addition, in this configuration, with the lens already driven to move to the specific end of the predetermined range, the inference section may take the position of the specific end as the present position of the lens. Thus, the present disclosure brings about a function to take the position of the specific end of the predetermined range as the present position of the lens after the lens has already been driven to move to the specific end.

On top of that, in this configuration, the supplying section may compute a driving quantity, by which the driven lens is to be moved, on the basis of the position of the specific end of the inferred predetermined range and on the basis of a position included in the predetermined range as a position farthest away from the specific end and, on the basis of the error information, the supplying section may supply a driving command for the computed driving quantity by taking a driving quantity computed for a usage environment, in which a driving quantity of the lens moving in one driving operation carried out by the focal-point adjustment device is smallest, as a reference. Thus, the present disclosure brings about a function to compute a driving quantity, by which the driven lens is to be moved, on the basis of the position of the specific end of the inferred predetermined range and on the basis of a position included in the predetermined range as a position farthest away from the specific end and to supply a driving command for the computed driving quantity by taking a driving quantity computed for a usage environment, in which a driving quantity of the lens moving in one driving operation carried out by the focal-point adjustment device is smallest, as a reference on the basis of the error information.

In addition, in this configuration, on the basis of the driving command and the error information, the inference section may compute:

a first driving quantity defined as the quantity of driving carried out in accordance with the driving command for a usage environment in which the driving quantity of the lens moving in one driving operation carried out by the focal-point adjustment device is largest; and a second driving quantity defined as the quantity of driving carried out in accordance with the driving command for a usage environment in which the driving quantity of the lens moving in one driving operation carried out by the focal-point adjustment device is smallest.

Then, the inference section may make use of:

the computed first driving quantity to update a first end serving as a range limit provided for the predetermined range on a range side relatively close to a destination of the driving according to the driving command; and the computed second driving quantity to update a second end serving as a range limit provided for the predetermined range on a range side relatively far away from the destination of the driving according to the driving command.

Subsequently, the inference section may infer a new predetermined range generated between the updated first and second ends to include the position at which the lens is located after the lens has been driven in accordance with the driving command.

Thus, the present disclosure brings about a function to update the predetermined range by making use of the first and second driving quantities.

In addition, in accordance with the first embodiment of the present disclosure, it is also possible to provide another configuration in which the error information includes:

information on errors for a usage environment in which the driving quantity of the lens moving in one driving operation carried out by the focal-point adjustment device is largest; and information on errors for a usage environment in which the driving quantity of the lens moving in one driving operation carried out by the focal-point adjustment device is smallest.

Thus, the present disclosure brings about a function to generate error information including:

information on errors for a usage environment in which the driving quantity of the lens moving in one driving operation carried out by the focal-point adjustment device is largest; and information on errors for a usage environment in which the driving quantity of the lens moving in one driving operation carried out by the focal-point adjustment device is smallest.

In addition, in this other configuration, the focal-point adjustment device is a piezoelectric device for moving the lens and the error information may include:

first information on an error caused by a change in temperature for a usage environment in which the driving quantity of the lens moving in one expansion or contraction operation carried out by the focal-point adjustment device is largest;

second information on an error caused by a change in temperature for a usage environment in which the driving quantity of the lens moving in one expansion or contraction operation carried out by the focal-point adjustment device is smallest;

third information on an error caused by a change in posture for a usage environment in which the driving quantity of the lens moving in one expansion or contraction operation carried out by the focal-point adjustment device is largest;

fourth information on an error caused by a change in posture for a usage environment in which the driving quantity of the lens moving in one expansion or contraction operation carried out by the focal-point adjustment device is smallest.

Thus, the present disclosure brings about a function to generate error information including the pieces of information on errors caused by a change in temperature and a change in posture.

On top of that, in this other configuration:

on the basis of the first information, the third information and the driving command, the inference section may compute a first driving quantity defined as the quantity of driving carried out in accordance with the driving command for a usage environment in which the driving quantity of the lens moving in one expansion or contraction operation carried out by the focal-point adjustment device is largest; and on the basis of the second information, the fourth information and the driving command, the inference section may compute a second driving quantity defined as the quantity of driving carried out in accordance with the driving command for a usage environment in which the driving quantity of the lens moving in one expansion or contraction operation carried out by the focal-point adjustment device is smallest;

Then, the inference section may make use of:

the computed first driving quantity to update a first end serving as a range limit provided for the predetermined range on a range side relatively close to a destination of the driving according to the driving command; and the computed second driving quantity to update a second end serving as a range limit provided for the predetermined range on a range side relatively far away from the destination of the driving according to the driving command.

Subsequently, the inference section may infer a new predetermined range generated between the updated first and second ends to include the position at which the lens is located after the lens has been driven in accordance with the driving command.

Thus, the present disclosure brings about a function to infer the predetermined range by making use of the information on errors caused by a change in temperature and a change in posture.

In addition, in this other configuration, the change in temperature can be a change of the temperature of the focal-point adjustment device whereas the change in posture can be a change of the posture of the imaging apparatus. Thus, the present disclosure brings about a function to include information on an error caused by a change of the temperature of the focal-point adjustment device and information on an error caused by a change of the posture of the imaging apparatus in the error information.

In addition, in accordance with the first embodiment of the present disclosure, it is also possible to provide a further configuration described as follows. In this further configuration, if the supplying section does not hold information on the position of the lens, the supplying section supplies a driving command capable of driving the lens through the entire distance between the two ends of the driving range of the lens for a usage environment in which the driving quantity of the lens moving in one driving operation carried out by the focal-point adjustment device is smallest. Thus, the present disclosure brings about a function to supply a driving command for driving the lens through the entire distance between the two ends of the driving range of the lens for a usage environment in which the driving quantity of the lens moving in one driving operation carried out by the focal-point adjustment device is smallest if the supplying section does not hold information on the position of the lens.

On top of that, in accordance with the first embodiment of the present disclosure, it is also possible to provide a still further configuration in which the lens is a focus lens. Thus, the present disclosure brings about a function to infer the position of the focus lens driven during an autofocus operation in a lens barrel 221 for accommodating lenses composing a plurality of lens groups.

In addition, in accordance with the first embodiment of the present disclosure, it is also possible to provide a still further configuration in which the focal-point adjustment device is either a piezoelectric device or a shape-memory alloy. Thus, the present disclosure brings about a function to provide a piezoelectric device or a shape-memory alloy as means for moving the lens.

On top of that, in accordance with the first embodiment of the present disclosure, it is also possible to provide a still further configuration in which the focal-point adjustment device moves the lens by making use of an increase and a decrease that are caused by repetition of expansion and contraction, which accompany abrupt and gradual changes of electric power supplied to the focal-point adjustment device to move the lens in the specific direction, as respectively an increase and a decrease of a force of friction between a lens driving shaft and the lens brought into contact with the focal-point adjustment device through the lens driving shaft. Thus, the present disclosure brings about a function to move the lens by making use of an increase and a decrease that are caused by repetition of expansion and contraction, which accompany abrupt and gradual changes of electric power supplied to the focal-point adjustment device to move the lens in the specific direction, as respectively an increase and decrease of a force of friction between a lens driving shaft and the lens brought into contact with the focal-point adjustment device through the lens driving shaft.

In addition, in accordance with the first embodiment of the present disclosure, it is also possible to provide a still further configuration in which the focal-point adjustment device changes or adjusts the focal-point distance by moving the lens or changing the shape of the lens. Thus, the present disclosure brings about a function to change or adjust the focal-point distance by moving the lens or changing the shape of the lens.

On top of that, in accordance with the first embodiment of the present disclosure, it is also possible to provide a still further configuration in which the focal-point adjustment device is either a piezoelectric device or a shape-memory alloy. Thus, the present disclosure brings about a function to provide a piezoelectric device or a shape-memory alloy as means for driving the lens.

In addition, in accordance with the first embodiment of the present disclosure, it is also possible to provide a still further configuration in which either a liquid lens, a conductive polymer actuator or a polymer resin material is used as the focal-point adjustment device which changes the shape thereof in accordance with electric power supplied thereto and the focal-point adjustment device changes or adjusts the focal-point distance by changing the shape of the lens. Thus, the present disclosure brings about a function to make use of either a liquid lens, a conductive polymer actuator or a polymer resin material as the focal-point adjustment device which changes the shape thereof in accordance with electric power supplied thereto and make use of the focal-point adjustment device to change or adjust the focal-point distance by changing the shape of the lens.

On top of that, in accordance with the first embodiment of the present disclosure, it is also possible to provide a still further configuration in which the supplying section supplies the driving command on the basis of a driving quantity by which the lens is to be moved and a driving direction in which the lens is to be moved. Thus, the present disclosure brings about a function to supply the driving command on the basis of a driving quantity by which the lens is to be moved and a driving direction in which the lens is to be moved.

In addition, in accordance with the first embodiment of the present disclosure, it is also possible to provide a still further configuration in which the inference section infers the position of the lens from count information representing the number of driving operations carried out by the focal-point adjustment device as operations corresponding to a distance from one of the two ends of the driving range of the lens to the position of the lens by taking:

the posture of the imaging apparatus in which the specific direction and a horizontal plane are parallel to each other as a reference posture of the imaging apparatus; and a driving quantity caused by one driving operation carried out by the focal-point adjustment device as a driving quantity of the lens for a usage environment in which the temperature of the focal-point adjustment device is a temperature determined in advance as a reference driving quantity.

Thus, the present disclosure brings about a function to infer the position of the lens from count information representing the number of driving operations carried out by the focal-point adjustment device as operations corresponding to a distance from one of the two ends of the driving range of the lens to the position of the lens by taking:

the posture of the imaging apparatus in which the specific direction and a horizontal plane are parallel to each other as a reference posture of the imaging apparatus; and a driving quantity caused by one driving operation carried out by the focal-point adjustment device as a driving quantity of the lens for a usage environment in which the temperature of the focal-point adjustment device is a temperature determined in advance as a reference driving quantity.

In accordance with the present disclosure, it is possible to provide an excellent capability of properly inferring the position of a lens.

BRIEF DESCRIPTION OF THE DRAWINGS

FIGS. 4A to 4C are a plurality of diagrams showing a model of a typical operation to update inferred-lens-position information when a focus lens is moved to the infinity-side mechanical end by making a full-stroke movement in accordance with an embodiment of the present disclosure;

FIGS. 6A and 6B are a plurality of diagrams each showing a model of typical operations carried out by the inferred-lens-position-information updating section to update inferred-lens-position information in accordance with an embodiment of the present disclosure when the focus lens is moved in the direction toward the proximity-side mechanical end;

FIG. 8 is a table showing a model of operations carried out by the inferred-lens-position-information updating section to update inferred-lens-position information in accordance, with an embodiment of the present disclosure;

DETAILED DESCRIPTION OF THE PREFERRED EMBODIMENTS

Implementations of the present disclosure are described below. In the following description, each of the implementations of the present disclosure is also referred to as an embodiment of the present disclosure.

Typical Functional Configuration of an Imaging Apparatus

Figure 1:
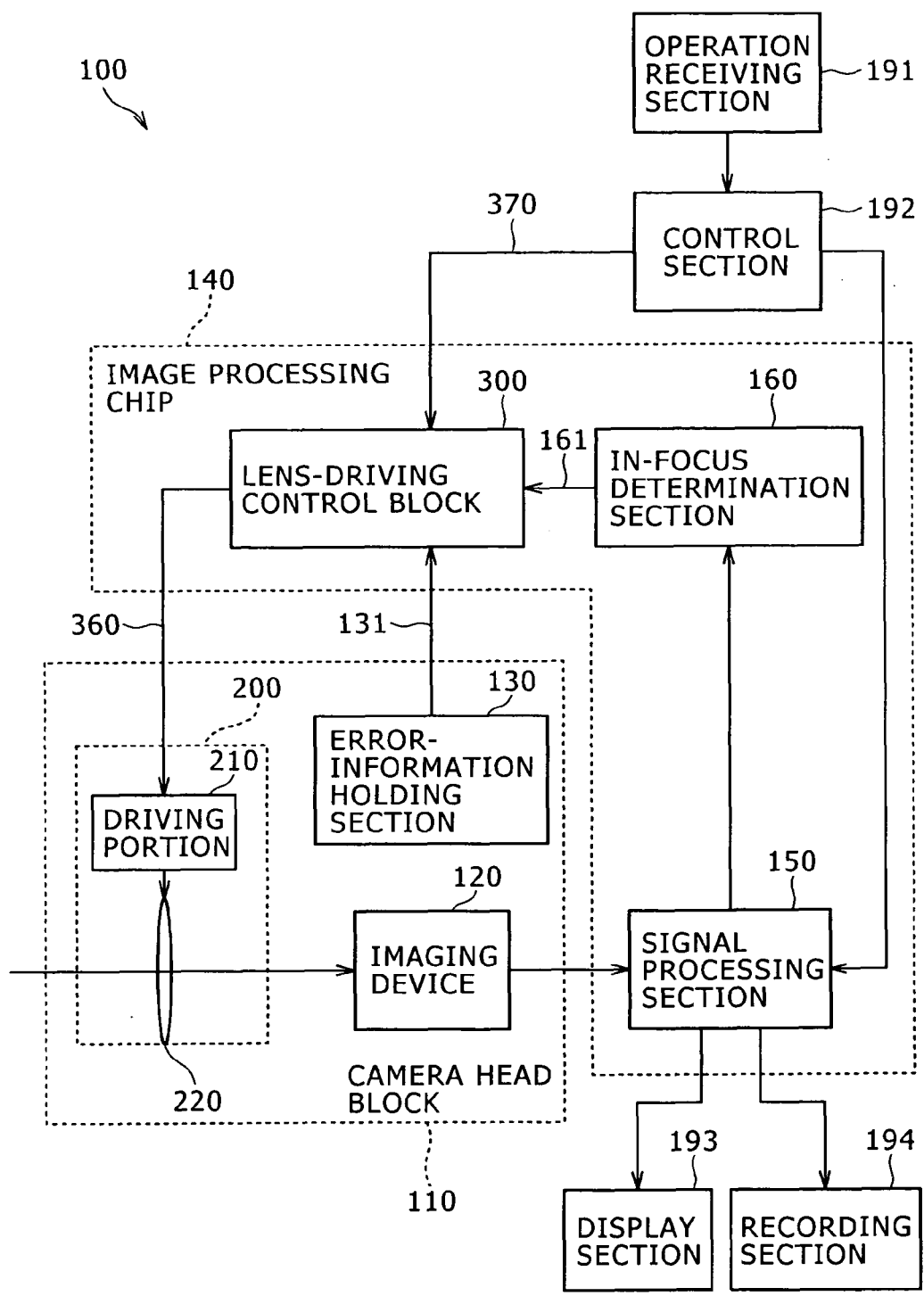
FIG. 1 is a block diagram showing a typical functional configuration of an imaging apparatus according to an embodiment of the present disclosure.

FIG. 1 is a block diagram showing a typical functional configuration of an imaging apparatus 100 according to an embodiment of the present disclosure. The imaging apparatus 100 takes an image of an imaging object, generates data of the image and records the data of the image as image contents also referred to as a recorded image. It is to be noted that the figure shows the imaging apparatus 100 used as a camera module employed in a portable information terminal such as a smart phone or a mobile phone.

As shown in the figure, the imaging apparatus 100 employs a camera head block 110, an image processing chip 140, an operation receiving section 191, a control section 192, a display section 193 and a recording section 194.

The camera head block 110 is configured to include a variety of optical members and an imaging device. The optical members are used for leading light coming from an imaging object to the imaging device. In the following description, the light coming from an imaging object is also referred to as object light. The camera head block 110 is typically implemented as a lens module mounted on a portable information terminal. To put it concretely, the camera head block 110 employs a lens section 200, an imaging device 120 and an error-information holding section 130.

The lens section 200 converges the object light. As shown in the same figure, the lens section 200 is configured to include a driving portion 210 and a focus lens 220. It is to be noted that the lens section 200 will be explained later in detail by referring to FIG. 2.

The driving portion 210 drives the focus lens 220. It is to be noted that, in the case of a first embodiment, an actuator serving as the driving portion 210 for driving the focus lens 220 is a piezoelectric device. The driving portion 210 typically moves the focus lens 220 in accordance with information computed by the image processing chip 140 as a command to move the focus lens 220. In the following description, the information computed by the image processing chip 140 as a command to move the focus lens 220 is also referred to as movement command information. It is to be noted that the movement command information is a typical example of a driving command cited in a claim of this specification of the present disclosure.

Driven by the driving portion 210, the focus lens 220 moves its position in the direction of the optical axis to adjust the focus.

The imaging device 120 carries out opto-electrical conversion to convert the object light into an electrical signal. That is to say, the imaging device 120 converts the object light incident thereto into the electrical signal. The imaging device 120 is implemented by a CMOS (Complementary Metal Oxide Semiconductor) sensor and a CCD (Charge Coupled Device) sensor.

The error-information holding section 130 holds information on errors of the movement distance by which the imaging device 120 has moved in an operation carried out by the driving portion 210 to drive the focus lens 220. In the following description, such information is also referred to as error information whereas the movement distance is also referred to as a movement quantity.

For example, if an actuator for moving the focus lens 220 is a piezoelectric device, an error is generated in a movement distance of the focus lens 220 driven by a pulse applied at one time due to a usage environmental-condition change such as a change of the temperature or a change of the imaging posture. The error-information holding section 130 holds error information indicating a movement-distance maximum and a movement-distance minimum which are caused by a pulse applied at one time. It is to be noted that the error information will be described later in detail by referring to FIG. 5.

The error-information holding section 130 is typically included in a lens module mounted on a portable information terminal. The error-information holding section 130 is implemented by a nonvolatile memory such as an EEPROM (Electrically Erasable Programmable Read Only Memory), a flash memory or a MRAM (Magneto-resistive Random Access Memory). The error-information holding section 130 is also used for recording factory-adjusted values such as values which are obtained as a result of a measurement of characteristics of the lens module and adjusted to a certain level. To be more specific, the factory-adjusted values include values which are obtained as a result of measuring variations of the lens-module characteristics and adjusted to a certain level. The error-information holding section 130 supplies the error information held therein to a lens-driving control block 300 to be described later through a signal line 131.

The image processing chip 140 controls operations of the camera head block 110 in order to generate an image. Typically, the image processing chip 140 is implemented as an ISP (Image Signal Processor) mounted on the portable information terminal. As shown in the figure, the image processing chip 140 employs a signal processing section 150, an in-focus determination section 160 and the lens-driving control block 300 cited above.

The signal processing section 150 carries out various kinds of signal processing on the electrical signal received from the imaging device 120 in order to generate image data which is the data of a static image.

The signal processing carried out by the signal processing section 150 on the electrical signal received from the imaging device 120 includes sampling processing, image development processing and YC separation processing. The signal processing section 150 supplies the image data to the display section 193 and the recording section 194.

In addition, the signal processing section 150 also provides the in-focus determination section 160 with data to be used in focal-point detection adopting a contrast detection method. In the focal-point detection adopting a contrast detection method, while the focus lens is being moved a little bit at a time, images are taken. The position at which an image with the highest contrast has been taken is then adopted as the focal point. If the in-focus determination section 160 determines a focal point by making use of a luminance signal Y for example, the in-focus determination section 160 acquires the luminance signal Y from the signal processing section 150.

On the basis of data received from the signal processing section 150 as the data to be used in the focal-point detection, the in-focus determination section 160 determines whether or not the focus coincides with a focusing object to which the focus is being adjusted. As described above, a typical example of the data to be used in the focal-point detection is the luminance signal Y. For example, the in-focus determination section 160 extracts a luminance signal Y corresponding to an area included in the focusing object and computes a focal-point evaluation value representing the degree of focusing from the extracted luminance signal Y. Then, the in-focus determination section 160 supplies the focal-point evaluation value to the lens-driving control block 300 through a signal line 161.

The lens-driving control block 300 controls movement command information which is information on a movement command issued when the driving portion 210 changes the position of the lens section 200. On the basis of information received from the control section 192, a focal-point evaluation value received from the in-focus determination section 160 and error information received from the error-information holding section 130, the lens-driving control block 300 generates information on the direction of a movement of the focus lens 220 and information on the number of times the piezoelectric device of the driving portion 210 is expanded or contracted. The lens-driving control block 300 supplies the information on the direction of a movement of the focus lens 220 and the information on the number of times the piezoelectric device of the driving portion 210 is expanded or contracted to the driving portion 210 through a signal line 360 as the movement command information. It is to be noted that the lens-driving control block 300 will be described later in detail by referring to FIG. 3.

The operation receiving section 191 recognizes an operation carried out by the user. To put it concretely, when the user carries out an operation to press a shutter button not shown in the figure for example, the operation receiving section 191 recognizes the operation as an imaging operation and supplies a signal representing the operation to the control section 192 as an operation signal.

The control section 192 controls operations carried out by the imaging apparatus 100. For example, the control section 192 receives an operation signal to start recording of a static image when the user carries out an operation to press the shutter button. In this case, the control section 192 provides the signal processing section 150 with static-imaging operation information which is information on execution of the recording of the static image.

In addition, in order to move the focus lens 220 to a mechanical end while the imaging apparatus 100 is being used, the control section 192 generates a mechanical-end-destined movement command which is a command for the movement of the focus lens 220 to the mechanical end. Then, the control section 192 supplies the mechanical-end-destined movement command to the lens-driving control block 300 through a signal line 370. The mechanical end is one end of a range in which the focus lens 220 can be moved to a mechanical stopper used as the end.

On top of that, in order to move the focus lens 220 to the mechanical end when the position of the focus lens 220 is unknown right after the power supply of the imaging apparatus 100 is turned on, the control section 192 generates a full-stroke command which is a command to drive the focus lens 220 to make a full stroke. Then, the control section 192 supplies the full-stroke command to the lens-driving control block 300 through the signal line 370.

In addition, when the user carries out a manual operation in order to move the focus lens 220, the control section 192 supplies manual-focus information to the lens-driving control block 300 through the signal line 370. The manual-focus information is information on a focus operation specified by the user.

The display section 193 displays an image on the basis of data received from the signal processing section 150 as the data of the image. The display section 193 is typically implemented by a color liquid-crystal panel.

The recording section 194 is used for recording an image received from the signal processing section 150 as image contents in an image file. As the recording section 194, typically, it is possible to make use of a disk such as a DVD (Digital Versatile Disk) or removable recording media such as a memory card made from a semiconductor memory. In the case of the removable recording media serving as the recording section 194, one or more removable recording mediums can be used as the media. In addition, the disk and/or the removable recording media may be embedded in the imaging apparatus 100. Further, it is possible to provide the imaging apparatus 100 with a configuration allowing the disk and/or the removable recording media to be mounted onto the imaging apparatus 100 and dismounted from the imaging apparatus 100 from time to time.

Typical Functional Configuration of the Lens Section

Figure 2:
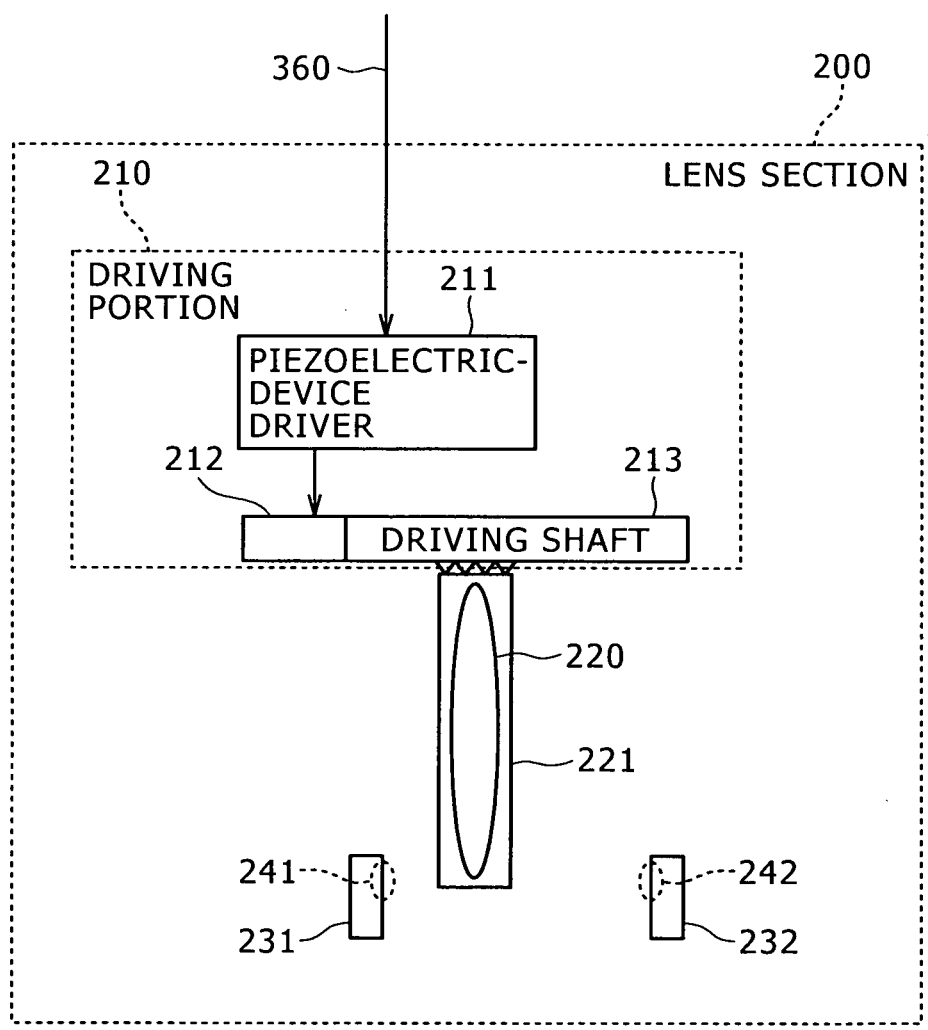
FIG. 2 is a block diagram showing a typical functional configuration of a lens section according to an embodiment of the present disclosure.

FIG. 2 is a block diagram showing a typical functional configuration of the lens section 200 according to an embodiment of the present disclosure.

As shown in the figure, the lens section 200 employs the driving portion 210, the focus lens 220, a lens barrel 221, a stopper 231 and another stopper 232.

Used for driving the focus lens 220 as explained earlier by referring to FIG. 1, the driving portion 210 employs a piezoelectric-device driver 211, a piezoelectric device 212 and a driving shaft 213.

In accordance with movement command information received from the lens-driving control block 300 through the signal line 360, the piezoelectric-device driver 211 applies a driving voltage to the piezoelectric device 212. The piezoelectric-device driver 211 applies the driving voltage to the piezoelectric device 212 as a pulse so as to make the expansion/the contraction of the piezoelectric device 212 keep up with abrupt and gradual driving-voltage changes in order to move the focus lens 220 in a movement direction indicated by the movement command information. It is to be noted that the movement command information shows a time count proportional to a pulse count. In this case, the time count is the number of times the piezoelectric device 212 is expanded and contracted whereas the pulse count is the number of driving-voltage pulses. It is also worth noting that, in the first embodiment of the present disclosure, in order to make the explanation easy to understand, the number of times the piezoelectric device 212 is expanded and contracted is assumed to be equal to the number of driving-voltage pulses.

The piezoelectric device 212 is an actuator for moving the focus lens 220 by repeating the expansion and the contraction in order to keep up with abrupt and gradual driving-voltage changes. The piezoelectric device 212 is a device which generates a displacement when a voltage is applied to the device. One of two ends of the piezoelectric device 212 is fixed on a holder of the lens section 200. The holder itself is not shown in the figure. The other end of the piezoelectric device 212 is attached to the driving shaft 213. The piezoelectric device 212 repeats the expansion and the contraction in order to keep up with abrupt and gradual driving-voltage changes in the direction of the optical axis of the focus lens 220, pulling and pushing the driving shaft 213 in the direction of the optical axis of the focus lens 220. The direction of the optical axis of the focus lens 220 is the horizontal direction in the figure. That is to say, the piezoelectric device 212 is a device capable of adjusting the focal-point distance by adjustment of the position of the focus lens 220. When the piezoelectric device 212 makes an expansion or a contraction, piezoelectric-device length resulting from the expansion or the contraction varies with changes in temperature. In addition, in the first embodiment of the present disclosure, in order to make the explanation easy to understand, the explanation is given by assuming only effects of the temperature. It is to be noted that the piezoelectric device 212 is a typical example of a focal-point adjustment device cited in a claim of this specification of the present disclosure.

The driving shaft 213 shifts the position of the focus lens 220 in accordance with expansion and contraction operations carried out by the piezoelectric device 212. The driving shaft 213 is a shaft brought into contact with the lens barrel 221 serving as a moved body. Frictions between the driving shaft 213 and the lens barrel 221 hold the position of the focus lens 220 held by the lens barrel 221. In addition, when the piezoelectric device 212 expands or contracts all of a sudden, the driving shaft 213 slips over a friction surface between the lens barrel 221 and the driving shaft 213 whereas the lens barrel 221 is held at the same position. When the piezoelectric device 212 expands or contracts slowly, on the other hand, the lens barrel 221 moves along with the driving shaft 213 due to the friction surface between the lens barrel 221 and the driving shaft 213. By repeating the expansion or contraction operation of the piezoelectric device 212, the position of the focus lens 220 can be shifted.

By moving the focus lens 220 in the direction of the optical axis as shown in FIG. 1, the focus can be adjusted.

The focus lens 220 is installed inside the lens barrel 221 which shifts and sustains the position of the focus lens 220 by making use of frictions between the driving shaft 213 and the lens barrel 221. It is to be noted that the focus lens 220 and the lens barrel 221 are a typical example of a lens cited in a claim of the specification of the present disclosure.

Stoppers 231 and 232 are mechanical stoppers limiting a range in which the focus lens 220 and the lens barrel 221 can be moved in the direction of the optical axis. That is to say, the stoppers 231 and 232 form mechanical ends limiting the range in which the focus lens 220 and the lens barrel 221 can be moved in the direction of the optical axis. The distance between the stoppers 231 and 232 is the maximum movement distance by which the focus lens 220 and the lens barrel 221 can be moved in the direction of the optical axis. It is to be noted that, in the embodiment of the present disclosure, the contact position between the stopper 231 and the lens barrel 221 is shown in the figure as a proximity-side mechanical end 241 whereas the contact position between the stopper 232 and the lens barrel 221 is shown as an infinity-side mechanical end 242.

Typical Functional Configuration of the Lens-Driving Control Block

Figure 3:
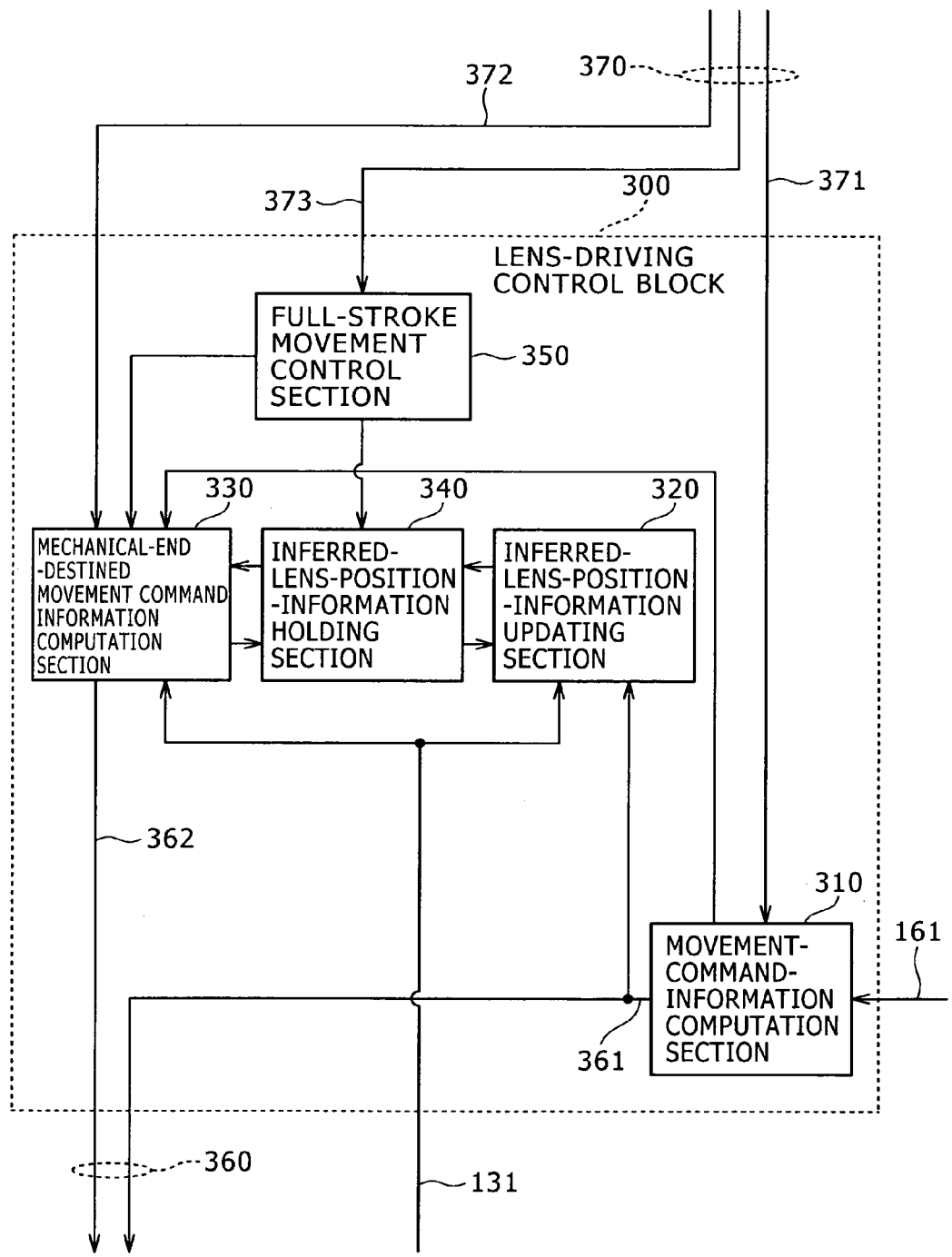
FIG. 3 is a block diagram showing a typical functional configuration of a lens-driving control section according to an embodiment of the present disclosure.

FIG. 3 is a block diagram showing a typical functional configuration of the lens-driving control block 300 according to an embodiment of the present disclosure.

As shown in the figure, the lens-driving control block 300 employs a movement-command-information computation section 310, an inferred-lens-position-information updating section 320, a mechanical-end-destined movement command information computation section 330, an inferred-lens-position-information holding section 340 and a full-stroke movement control section 350.

The movement-command-information computation section 310 generates movement-command information for adjusting the focus. To be more specific, the movement-command-information computation section 310 generates movement-command information in an autofocus operation on the basis of a focal-point evaluation value generated by the in-focus determination section 160. In addition, the movement-command-information computation section 310 generates movement-command information in a manual operation on the basis of a manual-focus information supplied to the lens-driving control block 300 through a signal line 371 which is one of the signal lines 370. The movement command information computed by the movement-command-information computation section 310 includes the number of driving-voltage pulses to be applied to the piezoelectric device 212 of the driving portion 210 in a focusing operation and the direction of the movement of the focus lens 220. Then, the movement-command-information computation section 310 supplies the movement command information to the inferred-lens-position-information updating section 320 and the driving portion 210 through a signal line 361 which is one of the signal lines 360.

In addition, when it is determined that the autofocus operation must be started all over again due to reasons such as precision sustainment and the need to complete the focusing in a shortest period of time, the movement-command-information computation section 310 does not supply the movement command information to the inferred-lens-position-information updating section 320 and the driving portion 210. Instead, the movement-command-information computation section 310 provides the mechanical-end-destined movement command information computation section 330 with an autofocus initialization command which is information required for bringing the focus lens 220 into contact with one of the mechanical ends 241 and 242 described earlier and starting the autofocus operation all over again from the beginning.

The inferred-lens-position-information holding section 340 holds inferred-lens-position information which is information used for inferring the position of the focus lens 220. The inferred-lens-position-information holding section 340 supplies the inferred-lens-position information to the inferred-lens-position-information updating section 320 and the mechanical-end-destined movement command information computation section 330.

When the full-stroke movement control section 350 receives a full-stroke command from the control section 192, the full-stroke movement control section 350 carries out control to make a full stroke. To put it in detail, when the full-stroke movement control section 350 receives a full-stroke command from the control section 192, the full-stroke movement control section 350 provides the mechanical-end-destined movement command information computation section 330 with a full-stroke execution command requesting the mechanical-end-destined movement command information computation section 330 to generate movement command information for driving the focus lens 220 to move by making a full stroke. In addition, the full-stroke movement control section 350 updates the inferred-lens-position information into information indicating the position of the mechanical end with which the focus lens 220 has been brought into contact as a result of the full-stroke movement made by the focus lens 220.

Every time the movement-command-information computation section 310 supplies the movement command information to the inferred-lens-position-information updating section 320, the inferred-lens-position-information updating section 320 updates the inferred-lens-position information. To put it in detail, the inferred-lens-position-information updating section 320 updates the inferred-lens-position information on the basis of the movement command information received from the movement-command-information computation section 310 and the error information supplied by the error-information holding section 130 through a signal line 131. It is to be noted that the inferred-lens-position information updated by the inferred-lens-position-information updating section 320 will be explained later by referring to FIGS. 4A to 4C.

The mechanical-end-destined movement command information computation section 330 is a section for generating movement command information used for bringing the lens barrel 221 of the focus lens 220 into contact with one of the mechanical ends 241 and 242. The mechanical-end-destined movement command information computation section 330 generates such movement command information when the mechanical-end-destined movement command information computation section 330 receives an autofocus initialization command from the movement-command-information computation section 310 or a command received from the control section 192 as a command to move the lens barrel 221 to one of the mechanical ends 241 and 242. The mechanical-end-destined movement command information computation section 330 generates such movement command information on the basis of inferred-lens-position information received from the inferred-lens-position-information holding section 340 and the error information supplied by the error-information holding section 130 through the signal line 131. In addition, when the mechanical-end-destined movement command information computation section 330 receives a full-stroke execution command from the control section 192, the mechanical-end-destined movement command information computation section 330 generates movement command information used for moving the lens barrel 221 over a full stroke. The mechanical-end-destined movement command information computation section 330 supplies the generated movement command information to the driving portion 210 through a signal line 362 which is one of the signal lines 360. It is to be noted that, after the movement command information has been generated, the mechanical-end-destined movement command information computation section 330 updates the inferred-lens-position information to information indicating the position of a mechanical end with which the focus lens 220 has been brought into contact as a result of the full-stroke movement made by the focus lens 220.

It is to be noted that the mechanical-end-destined movement command information computation section 330 and the movement-command-information computation section 310 are a typical example of a command supplying section cited in a claim of this specification of the present disclosure. In addition, the mechanical-end-destined movement command information computation section 330, the inferred-lens-position-information updating section 320 and the full-stroke movement control section 350 are a typical example of a position inference section cited in a claim of this specification of the present disclosure.

Typical Updating of Inferred-Lens-Position Information After a Full-Stroke Movement of the Focus Lens FIGS. 4A to 4C are a plurality of diagrams showing a model of a typical operation to update inferred-lens-position information when the focus lens 220 is moved to the infinity-side mechanical end 242 by making a full-stroke movement in accordance with an embodiment of the present disclosure.

To be more specific, FIG. 4A shows a model of a typical operation to update inferred-lens-position information after the focus lens 220 has been brought into contact with the infinity-side mechanical end 242 by making a full-stroke movement only right after the power supply has been turned on. In FIG. 4A, the horizontal axis represents the range of a movement made by the focus lens 220. FIG. 4A shows a model of the focus lens 220 whose position is unknown and a full-stroke movement requested quantity 411 which is movement command information supplied to the driving portion 210 in a full-stroke movement.

It is to be noted that, in this embodiment of the present disclosure, the movement range of a movement made by the focus lens 220 is the distance between the position of an infinity-side mechanical end 242 and the position of the proximity-side mechanical end 241. The distance from the position of the infinity-side mechanical end 242 to a specific position in the movement range is expressed by a relative value assigned to the specific position as a value in a numerical range of 0 to 1.00. The relative value is a value relative to a reference value of 0 assigned to the position of the infinity-side mechanical end 242. The relative value assigned to any specific position in the movement range is the number of driving operations to be carried out to move the lens barrel 221 from the specific position to the position of the infinity-side mechanical end 242 on the assumption that the imaging apparatus 100 is used in a reference usage environment defined as a usage environment in which the lens section 200 is generally used most frequently. Typically, in the reference usage environment, the normal temperature is 25 degrees Celsius and the imaging apparatus 100 is put in such a posture that the focus lens 220 moves in the direction of the optical axis which is parallel to a horizontal plane. Since each of the driving operations is carried out to move the lens barrel 221 by applying a pulse to the piezoelectric device 212 in the imaging apparatus 100 used in the reference usage environment, the number of driving operations is also referred to as the number of reference pulses.

That is to say, in this embodiment, the distance from the position of the infinity-side mechanical end 242 to any specific position in the movement range is expressed by a driving-operation count assigned to the specific position to represent the number of driving operations to be carried out in order to move the lens barrel 221 from the specific position to the position of the infinity-side mechanical end 242 or a reference pulse count assigned to the specific position to represent the number of reference pulses to be applied to the piezoelectric device 212 in order to move the lens barrel 221 from the specific position to the position of the infinity-side mechanical end 242 on the assumption that the imaging apparatus 100 is used in the reference usage environment and a reference pulse count of 0 or a driving-operation count of 0 is assigned to the position of the infinity-side mechanical end 242. Thus, the distance by which the focus lens 220 can be moved is expressed by a reference pulse count also referred to as a driving-operation count in a numerical range of 0 to 1,000.

The following description explains a full-stroke movement made only right after the power supply in the imaging apparatus 100 has been turned on.

The imaging apparatus 100 is not provided with a sensor for detecting the position of the focus lens 220. In addition, right after the power supply in the imaging apparatus 100 is turned on, the imaging apparatus 100 does not hold the inferred-lens-position information. Thus, right after the power supply in the imaging apparatus 100 is turned on, the position of the focus lens 220 is unknown. In order to solve this problem, the imaging apparatus 100 carries out initialization in order to bring the lens barrel 221 of the focus lens 220 into contact with the infinity-side mechanical end 242. With the lens barrel 221 of the focus lens 220 brought into contact with the infinity-side mechanical end 242, the imaging apparatus 100 is put in a state allowing the position of the focus lens 220 to be inferred. It is to be noted that an expansion/contraction count included in the movement contact information used for the initialization is a value allowing the lens barrel 221 of the focus lens 220 to be brought into contact with the infinity-side mechanical end 242 even if the focus lens 220 is located at a position farthest away from the infinity-side mechanical end 242 in a special usage environment in which the focus lens 220 is moved least frequently. The position farthest away from the infinity-side mechanical end 242 is the position of the proximity-side mechanical end 241 whereas, in the special usage environment, the distance by which the focus lens 220 is moved due to one expansion or one contraction made by the piezoelectric device 212 is shortest among all usage environments. FIG. 4A shows the full-stroke movement requested quantity 411 used as this movement command information.

The full-stroke movement requested quantity 411 is shown as a model of the movement command information supplied by the mechanical-end-destined movement command information computation section 330 to the driving portion 210 in a full-stroke movement. That is to say, the direction of a bold arrow line shown by the full-stroke movement requested quantity 411 is a movement direction included in the movement command information whereas the length of the bold arrow line represents an expansion/contraction count included in the movement command information. In the following description, the expansion/contraction count representing the number of expansions/contractions is also referred to as a pulse count representing the number of pulses. In the example shown in the figure, the length of the bold arrow line represents a pulse count of about 1,250. When the movement command information represented by the full-stroke movement requested quantity 411 is supplied by the mechanical-end-destined movement command information computation section 330 to the driving portion 210, the piezoelectric device 212 expands or contracts by a displacement indicated by a pulse count included in the movement command information so as to move the focus lens 220 in a movement direction indicated by the movement command information. Thus, the focus lens 220 moves in a direction toward the position of the infinity-side mechanical end 242.

It is to be noted that, if the imaging apparatus 100 is used in the reference usage environment, the distance by which the focus lens 220 can move in accordance with the full-stroke movement requested quantity 411 is the distance between the right and left ends of the bold-line arrow representing the full-stroke movement requested quantity 411. In the case of the typical example shown in FIG. 4A, this distance is about 1.25. If the imaging apparatus 100 is used in the aforementioned special usage environment in which the focus lens 220 moves due to one expansion or one contraction made by the piezoelectric device 212 by a distance shortest among all usage environments, on the other hand, the distance by which the focus lens 220 can move in accordance with the full-stroke movement requested quantity 411 is the distance between the positions of the infinity-side mechanical end 242 and the proximity-side mechanical end 241. In the case of the typical example shown in FIG. 4A, this distance is about 1.0.

FIG. 4B shows a model of the focus lens 220 already brought into contact with the infinity-side mechanical end 242 as a result of a full-stroke movement.

The focus lens 220 has already been brought into contact with the infinity-side mechanical end 242 as shown in FIG. 4B as a result of a full-stroke movement made right after the power supply of the imaging apparatus 100 has been turned on, putting the imaging apparatus 100 in a state allowing the position of the focus lens 220 to be inferred. Then, the inferred-lens-position information held by the inferred-lens-position-information holding section 340 is updated in order to initialize the inferred-lens-position information.

FIG. 4C shows a model of the inferred-lens-position information which is updated following an operation to bring the focus lens 220 into contact with the infinity-side mechanical end 242 as a result of a full-stroke movement made right after the power supply of the imaging apparatus 100 has been turned on. FIG. 4C also shows a model of initialization of three pieces of position information composing the inferred-lens-position information. The three pieces of position information are information on a virtual position 421, information on an infinity-side erroneous position 422 and information on a proximity-side erroneous position 423 respectively.

The inferred-lens-position information held by the inferred-lens-position-information holding section 340 is explained as follows. As described above, the inferred-lens-position information is composed of the three pieces of position information which are the information on the virtual position 421, the information on the infinity-side erroneous position 422 and the information on the proximity-side erroneous position 423 respectively. In the following description, the information on the virtual position 421, the information on the infinity-side erroneous position 422 and the information on the proximity-side erroneous position 423 are referred to as virtual-position information, infinity-side erroneous-position information and proximity-side erroneous-position information respectively.

The information on the virtual position 421 is information on the position of the focus lens 220 assumed to have been driven in the reference usage environment. It is to be noted that the virtual-position information is expressed by a reference pulse count representing the virtual position 421. In this case, the reference pulse count is the number of reference pulses to move the focus lens 220 from the position of the infinity-side mechanical end 242 to the virtual position 421. The virtual-position information is updated every time the focus lens 220 is moved in accordance with movement command information by adding a pulse count included in the movement command information to the virtual-position information or by subtracting the pulse count from the virtual-position information.

Figure 5:
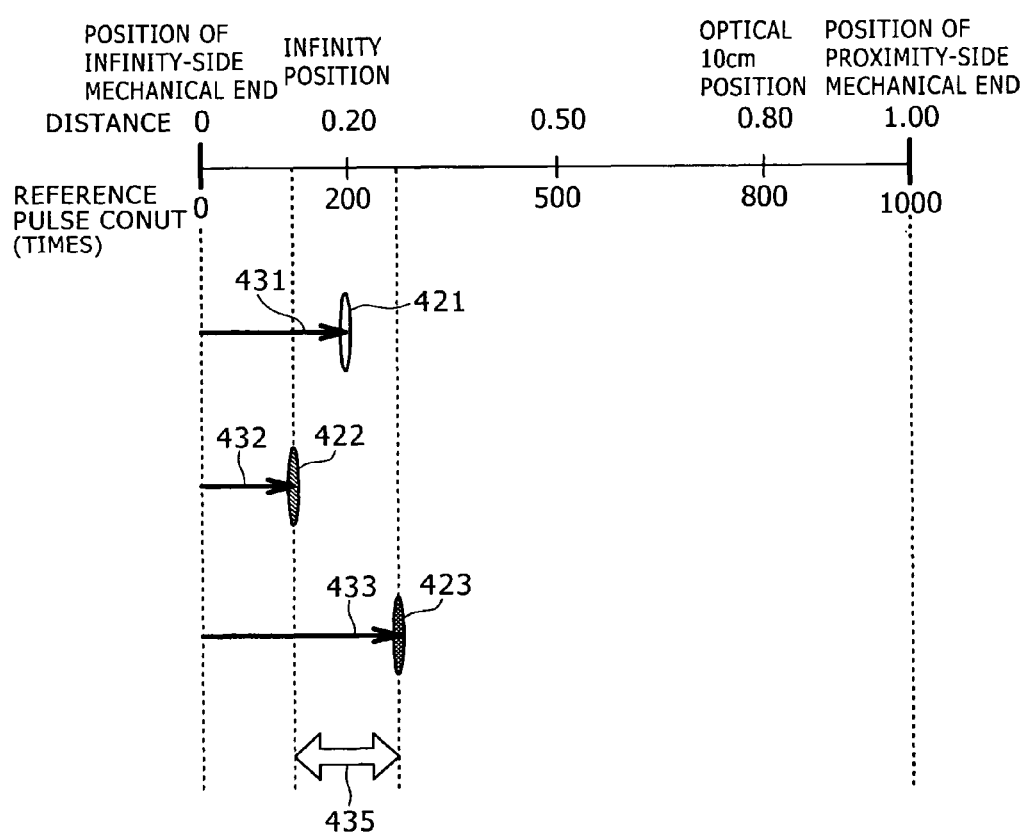
FIG. 5 is a diagram showing a model of typical operations carried out by the inferred-lens-position-information updating section to update inferred-lens-position information in accordance with an embodiment of the present disclosure when the focus lens is moved from the infinity-side mechanical end.

The infinity-side erroneous-position information is information on the infinity-side erroneous position 422 of the focus lens 220. The infinity-side erroneous position 422 is a position at which the focus lens 220 is located after a movement for which an error generated therein is taken into consideration. The infinity-side erroneous position 422 is a position closest to the infinity side among positions of the focus lens 220 moved in movements generating different movement errors as shown in FIG. 5. It is to be noted that the infinity-side erroneous-position information is expressed by a reference pulse count representing the infinity-side erroneous position 422. In this case, the reference pulse count is the number of reference pulses to move the focus lens 220 from the position of the infinity-side mechanical end 242 to the infinity-side erroneous position 422. The infinity-side erroneous-position information is updated every time the focus lens 220 is moved by adding the reference pulse count corresponding to a movement quantity taking the movement error into consideration to the infinity-side erroneous-position information or by subtracting the reference pulse count from the infinity-side erroneous-position information.

The proximity-side erroneous-position information is information on the proximity-side erroneous position 423 of the focus lens 220. The proximity-side erroneous position 423 is a position at which the focus lens 220 is located after a movement for which an error generated therein is taken into consideration. The proximity-side erroneous position 423 is a position closest to the proximity side among positions of the focus lens 220 moved in movements generating different movement errors as shown in FIG. 5. It is to be noted that the proximity-side erroneous-position information is expressed by a reference pulse count representing the proximity-side erroneous position 423. In this case, the reference pulse count is the number of reference pulses to move the focus lens 220 from the position of the proximity-side mechanical end 241 to the proximity-side erroneous position 423. The proximity-side erroneous-position information is updated every time the focus lens 220 is moved by adding the reference pulse count corresponding to a movement quantity taking the movement error into consideration to the proximity-side erroneous-position information or by subtracting the reference pulse count from the proximity-side erroneous-position information.

As shown in FIG. 4C, when the focus lens 220 is brought into contact with the infinity-side mechanical end 242 in a full-stroke movement, the virtual-position information, the infinity-side erroneous-position information and the proximity-side erroneous-position information are each updated to information on the position of the infinity-side mechanical end 242. That is to say, as shown by the virtual position 421, the infinity-side erroneous position 422 and the proximity-side erroneous position 423 which are placed at the position of the infinity-side mechanical end 242, the virtual-position information, the infinity-side erroneous-position information and the proximity-side erroneous-position information are each updated (or initialized) to a pulse count of 0 indicating the position of the infinity-side mechanical end 242.

Right after the power supply of the imaging apparatus 100 is turned on, the imaging apparatus 100 does not hold the inferred-lens-position information showing the position of the focus lens 220. It is thus necessary to bring the focus lens 220 into contact with the infinity-side mechanical end 242. For this reason, the full-stroke movement control section 350, the mechanical-end-destined movement command information computation section 330 and the inferred-lens-position-information holding section 340 supply movement command information for a full-stroke movement of the focus lens 220 to the driving portion 210 and initialize the inferred-lens-position information.

Typical Updating of Inferred-Lens-Position Information after a Movement of the Focus Lens from the Infinity-Side Mechanical End FIG. 5 is a diagram showing a model of typical operations carried out by the inferred-lens-position-information updating section 320 to update inferred-lens-position information in accordance with an embodiment of the present disclosure after the focus lens 220 has been moved from the infinity-side mechanical end 242.

In the model shown in the figure, it is assumed that the focus lens 220 is moved at one time from the position of the infinity-side mechanical end 242 in the direction toward the position of proximity-side mechanical end 241 in accordance with movement command information used for expanding or contracting the piezoelectric device 212 200 times. This movement made by the focus lens 220 at one time from the position of the infinity-side mechanical end 242 in the direction toward the position of proximity-side mechanical end 241 is referred to as a first movement. In the following description with reference to FIG. 5 and subsequent figures, a movement made by the focus lens 220 to come in contact with the infinity-side mechanical end 242 is referred to as the 0th movement made prior to the first movement.

The figure shows a model of pieces of information by making use of the virtual position 421, the infinity-side erroneous position 422 and proximity-side erroneous position 423. These pieces of information are included in the inferred-lens-position information updated on the basis of the movement command information used for expanding or contracting the piezoelectric device 212 200 times in order to move the focus lens 220 from the position of the infinity-side mechanical end 242 in the direction toward the position of proximity-side mechanical end 241.

Operations to update the pieces of information is explained by referring to the figure as follows.

First of all, a typical operation to update the virtual-position information $S_n$ is explained by making use of the virtual position 421 in the explanation as follows. In a movement in the direction toward the position of proximity-side mechanical end 241, the virtual-position information $S_n$ is updated in accordance with Eq. (1) given below.

$$S_n = S_{n-1} + E \quad (1)$$

Notation $S_{n-1}$ used in the above equation denotes the (n−1)th virtual-position information obtained prior to the movement made on the basis of the movement command information. That is to say, in the model shown in the figure, the virtual-position information $S_{n-1}$ is a reference pulse count of 0 representing the position of the focus lens 220 brought into contact with the infinity-side mechanical end 242.

On the other hand, notation E denotes a reference pulse-count representing the movement quantity by which the focus lens 220 is moved on the basis of the movement command information in the reference usage environment. That is to say, notation E denotes a requested movement quantity which is the quantity of the movement made by the focus lens 220 if the focus lens 220 is moved as desired in accordance with the movement command information.

The requested movement quantity E is computed in accordance with Eq. (2) given as follows:

$$E = P \quad (2)$$

Notation P used in the above equation denotes a pulse count (or an expansion/contraction count) specified by the movement command information in the nth driving operation. That is to say, in the model shown in the figure, in case of the first movement, the pulse count P is a pulse count included in the movement command information supplied by the movement-command-information computation section 310 to the driving portion 210 as a pulse count of 200. Thus, in accordance with Eq. (2), the requested movement quantity E is also 200. It is to be noted that, in the figure, the requested movement quantity E is shown as a requested movement quantity 431 which is an arrow extended from the position of the infinity-side mechanical end 242 to the virtual position 421.

As described above, when the focus lens 220 is moved in the direction toward the proximity-side mechanical end 241, the virtual-position information $S_n$ is updated by adding the requested movement quantity E which is a pulse count indicated by the movement command information to the virtual-position information $S_{n-1}$ obtained prior to the movement made by the focus lens 220. As shown in the figure, to put it concretely, after the focus lens 220 already brought into contact with the infinity-side mechanical end 242 has been moved in the direction toward the proximity-side mechanical end 241 by carrying out expansion or contraction 200 times, the virtual-position information $S_n$ is updated from 0 to 200 as indicated by the virtual position 421.

Next, an operation to update the infinity-side erroneous-position information is explained by making use of the infinity-side erroneous position 422 in the explanation.

When the focus lens 220 is moved in the direction toward the proximity-side mechanical end 241, the infinity-side erroneous-position information $I_n$ is computed in accordance with Eq. (3) given as follows:

$$I_n = I_{n-1} + F \quad (3)$$

Notation $I_{n-1}$ used in the above equation denotes the (n−1)th infinity-side erroneous-position information obtained before the focus lens 220 is moved on the basis of movement command information. That is to say, in the model shown in the figure, the infinity-side erroneous-position information $I_{n-1}$ is a reference pulse count of 0 representing the position of the focus lens 220 brought into contact with the infinity-side mechanical end 242.

On the other hand, notation F denotes a reference pulse count representing smallest movement quantity by which the focus lens 220 is moved in a most difficult movement in which the focus lens 220 is moved by a shortest movement distance during an operation to drive the focus lens 220 in accordance with a pulse count specified by the movement command information.

The smallest movement quantity F is computed in accordance with Eq. (4) given as follows:

$$F = P \times C_{min} \quad (4)$$

Notation $C_{min}$ used in the above equation denotes a smallest movement quantity computation coefficient representing a relation between the distance quantity F by which the focus lens 220 is moved in the most difficult movement and the pulse count P representing the desired movement quantity E in the reference usage environment.

The smallest movement quantity computation coefficient $C_{min}$ is explained more as follows. It is to be noted that, in the following explanation, the quantity of a movement caused by expansions (or contractions) of the piezoelectric device 212 as a movement of the focus lens 220 is assumed to include an error of up to ±10% of the movement quantity for the reference posture in the reference usage environment if the posture of the imaging apparatus 100 is changed from the reference posture. In addition, the quantity of a movement caused by expansions (or contractions) of the piezoelectric device 212 as a movement of the focus lens 220 is assumed to also include an error of up to ±30% of the movement quantity at the reference temperature in the reference usage environment if the temperature of the imaging apparatus 100 is changed from the reference temperature. It is also worth noting that information on these errors is held in the error-information holding section 130. Information on these errors includes the maximum and minimum values of the error caused by the change in posture as well as the maximum and minimum values of the error caused by the change in temperature.

In this case, the smallest movement quantity computation coefficient $C_{min}$ is computed in accordance with typically Eq. (5) given as follows:

$$C_{min}=(1(100\%)-0.1(10\%))\times(1(100\%)-0.3(30\%)). \quad (5)$$

As obvious from the above equation, if the movement quantity changes due to a plurality of causes, the smallest movement quantity computation coefficient $C_{min}$ is computed by considering movement-quantity decreases attributed to their respective causes.

From Eq. (5), the smallest movement quantity computation coefficient $C_{min}$ for the assumed case shown in the figure is found to be 0.63 (=0.9×0.7). In this case, since P=200 and $C_{min}$=0.63, a value computed in accordance with Eq. (4) as the value of the smallest movement quantity F is 126 (=200× 0.63) which is obtained finally by truncation of the fraction part of the computation result. Thus, the value of the infinity-side erroneous-position information $I_n$ computed in accordance with Eq. (3) is also 126 because the infinity-side erroneous-position information $I_{n-1}$ is 0. It is to be noted that, in the figure, the smallest movement quantity F is shown as a smallest movement quantity 432 which is an arrow extended from the position of the infinity-side mechanical end to the infinity-side erroneous position 422.

As described above, when the focus lens 220 is moved in the direction toward the proximity-side mechanical end, the infinity-side erroneous-position information $I_n$ is updated by adding the smallest movement quantity F to the infinity-side erroneous-position information Next, an operation to update the proximity-side erroneous-position information is explained by making use of the proximity-side erroneous position 423 in the explanation.

When the focus lens 220 is moved in the direction toward the proximity-side mechanical end 241, the proximity-side erroneous-position information $M_n$ is computed in accordance with Eq. (6) given as follows:

$$M_n=M_{n-1}+G \quad (6)$$

Notation $M_{n-1}$ used in the above equation denotes the (n−1)th proximity-side erroneous-position information obtained before the focus lens 220 is moved on the basis of movement command information. That is to say, in the model shown in the figure, the proximity-side erroneous-position information $M_{n-1}$ is a reference pulse count of 0 representing the position of the focus lens 220 brought into contact with the infinity-side mechanical end 242.

On the other hand, notation G denotes a reference pulse count representing a largest movement quantity by which the focus lens 220 is moved in an easiest movement in which the focus lens 220 is moved by a longest movement distance during an operation to drive the focus lens 220 in accordance with a pulse count specified by the movement command information.

The largest movement quantity G is computed in accordance with Eq. (7) given as follows:

$$G=P\times C_{max} \quad (7)$$

Notation $C_{max}$ used in the above equation denotes a largest movement quantity computation coefficient representing a relation between the distance quantity G by which the focus lens 220 is moved in the easiest movement and the pulse count P representing the desired movement quantity E in the reference usage environment.

The largest movement quantity computation quantity coefficient $C_{max}$ is explained more as follows. It is to be noted that, in the following explanation, as described before in the explanation of the smallest movement quantity computation coefficient $C_{min}$, the quantity of a movement of the focus lens 220 is assumed to include an error of up to ±10% of the movement quantity for the reference posture in the reference usage environment. In addition, the quantity of a movement of the focus lens 220 is assumed to also include an error of up to ±30% of the movement quantity at the reference temperature.

In this case, the largest movement quantity computation quantity coefficient $C_{max}$ is computed in accordance with typically Eq. (8) given as follows:

$$C_{max}=(1(100\%)+0.1(10\%))\times(1(100\%)+0.3(30\%)). \quad (8)$$

As obvious from the above equation, if the movement quantity changes due to a plurality of causes, the largest movement quantity computation quantity coefficient $C_{max}$ is computed by considering movement-quantity increases attributed to their respective causes.

From Eq. (8), the largest movement quantity computation quantity coefficient $C_{max}$ for the assumed case shown in the figure is found to be 1.43 (=1.1×1.43). In this case, since P=200 and $C_{max}$=1.43, a value computed in accordance with Eq. (7) as the value of the largest movement quantity G is 286 (=200×1.43) which is obtained by finally truncation of the fraction part of the computation result. Thus, the value of proximity-side erroneous-position information $M_n$ computed in accordance with Eq. (6) is also 286 because the proximity-side erroneous-position information $M_{n-1}$ is 0. It is to be noted that, in the figure, the largest movement quantity G is shown as a largest movement quantity 433 which is an arrow extended from the position of the infinity-side mechanical end to the proximity-side erroneous position 423.

As described above, when the focus lens 220 is moved in the direction toward the proximity-side mechanical end, the proximity-side erroneous-position information $M_n$ is updated by adding the largest movement quantity G to the proximity-side erroneous-position information $M_{n-1}$.

As described above, each time the focus lens 220 is moved, the inferred-lens-position-information updating section 320 updates the inferred-lens-position information by making use of the movement command information and the error information. By updating the inferred-lens-position information, a lens-position range 435 shown in FIG. 5 can be found. The lens-position range 435 is a range of an inferred position of the focus lens 220. That is to say, the lens-position range 435 is a range of the position of a destination of a movement made by the focus lens 220 as a movement for which errors are taken into consideration.

As described above, only errors caused by a change in posture and a change in temperature are taken into consideration. It is to be noted, however, that errors to be taken into consideration are by no means limited to the errors caused by the changes in posture and temperature. That is to say, errors to be taken into consideration may also include an error caused by the piezoelectric device 212 serving as an actuator.

Typical Updating of Inferred-Lens-Position Information After a Movement of the Focus Lens in the Direction to the Proximity Side FIGS. 6A and 6B are a plurality of diagrams each showing a model of typical operations carried out by the inferred-lens-position-information updating section 320 to update inferred-lens-position information in accordance with an embodiment of the present disclosure when the focus lens 220 has been moved in the direction toward the proximity-side mechanical end 241.

In the following description, a second movement following the first movement explained above by referring to FIG. 5 is assumed. It is also assumed that, in the second movement, the driving portion 210 is driven by movement command information used for moving the focus lens 220 in the direction toward the proximity-side mechanical end 241 by expanding or contracting the piezoelectric device 212 200 times in the same way as the first movement explained above by referring to FIG. 5.

To be more specific, FIG. 6A shows a model of the second movement made by the focus lens 220 in the direction toward the proximity-side mechanical end 241.

To put it concretely, FIG. 6A shows a virtual position (n−1) 441, an infinity-side erroneous position (n−1) 442 and a proximity-side erroneous position (n−1) 443 which are information included in inferred-lens-position information obtained prior to the second movement made on the basis of the movement command information for the second movement but obtained after the completion of the first movement. In addition, for each of the virtual position (n−1) 441, the infinity-side erroneous position (n−1) 442 and the proximity-side erroneous position (n−1) 443, FIG. 6A also shows a requested movement quantity 451, a smallest movement quantity 452 and a largest movement quantity 453 which are movement quantities for the second movement. On top of that, FIG. 6A also shows a lens-position range 455 which is a range of the position of a destination of a movement made by the focus lens 220 as a movement for which errors are taken into consideration.

The lens-position range 455 shown in FIG. 6A is wider than the lens-position range 435 shown in FIG. 5. As described above, the lens-position range 455 is a range of an inferred position of the focus lens 220 making the second movement also referred to as the nth movement in the following description with reference to FIGS. 6A and 6B whereas the lens-position range 435 is a range of an inferred position of the focus lens 220 making the first movement also referred to as the (n−1)th movement.

FIG. 6B shows a model of a virtual position (n) 444, an infinity-side erroneous position (n) 445 and a proximity-side erroneous position (n) 446 which are included in inferred-lens-position information updated on the basis of the movement command information for the second movement. It is to be noted that items shown in FIG. 6B as items other than the virtual position (n) 444, the infinity-side erroneous position (n) 445 and the proximity-side erroneous position (n) 446 are identical with their respective counterparts shown in FIG. 6A so that the explanation of the identical items is omitted.

By referring to FIGS. 6A and 6B, the following description explains operations to update the inferred-lens-position information for a case in which the second movement is a movement made by the focus lens 220 in the direction toward the proximity-side mechanical end 241.

First of all, an operation to update the virtual-position information is explained as follows. Since the virtual-position information is information on the position of focus lens 220 driven in the reference usage environment, the virtual-position information is updated after the second movement by adding the requested movement quantity specified for the second movement to the virtual-position information (n−1) obtained for the first movement. That is to say, the virtual-position information is updated on the basis of Eqs. (1) and (2) used in the operation to update the virtual-position information for the first movement explained earlier by referring to FIG. 5.

Next, an operation to update the infinity-side erroneous-position information is explained as follows. Since the infinity-side erroneous-position information is information on a lens position found by taking movement errors into consideration as a position closest to the infinity-side mechanical end 242, the infinity-side erroneous-position information is updated after the second movement by adding the smallest movement quantity to the infinity-side erroneous-position information (n−1) obtained for the first movement. That is to say, the infinity-side erroneous-position information is updated on the basis of Eqs. (3) to (5) used in the operation to update the infinity-side erroneous-position information for the first movement explained earlier by referring to FIG. 5.

Next, an operation to update the proximity-side erroneous-position information is explained as follows. Since the proximity-side erroneous-position information is information on a lens position found by taking movement errors into consideration as a position closest to the proximity-side mechanical end 241, the proximity-side erroneous-position information is updated after the second movement by adding the largest movement quantity to the infinity-side erroneous-position information (n−1) obtained for the first movement. That is to say, the proximity-side erroneous-position information is updated on the basis of Eqs. (6) to (8) used in the operation to update the infinity-side erroneous-position information for the first movement explained earlier by referring to FIG. 5.

As described above, the virtual-position information, the infinity-side erroneous-position information and the proximity-side erroneous-position information which are included in the inferred-lens-position information are updated for the second movement made in the direction toward the proximity-side mechanical end 241 on the basis of Eqs. (1) to (8). That is to say, if the direction of the movement is the direction toward the proximity-side mechanical end 241, the virtual-position information, the infinity-side erroneous-position information and the proximity-side erroneous-position information which are included in the inferred-lens-position information are updated on the basis of Eqs. (1) to (8) without regard to whether the movement is the first movement, the second movement or any subsequent movement following the second movement.

Figure 7A:
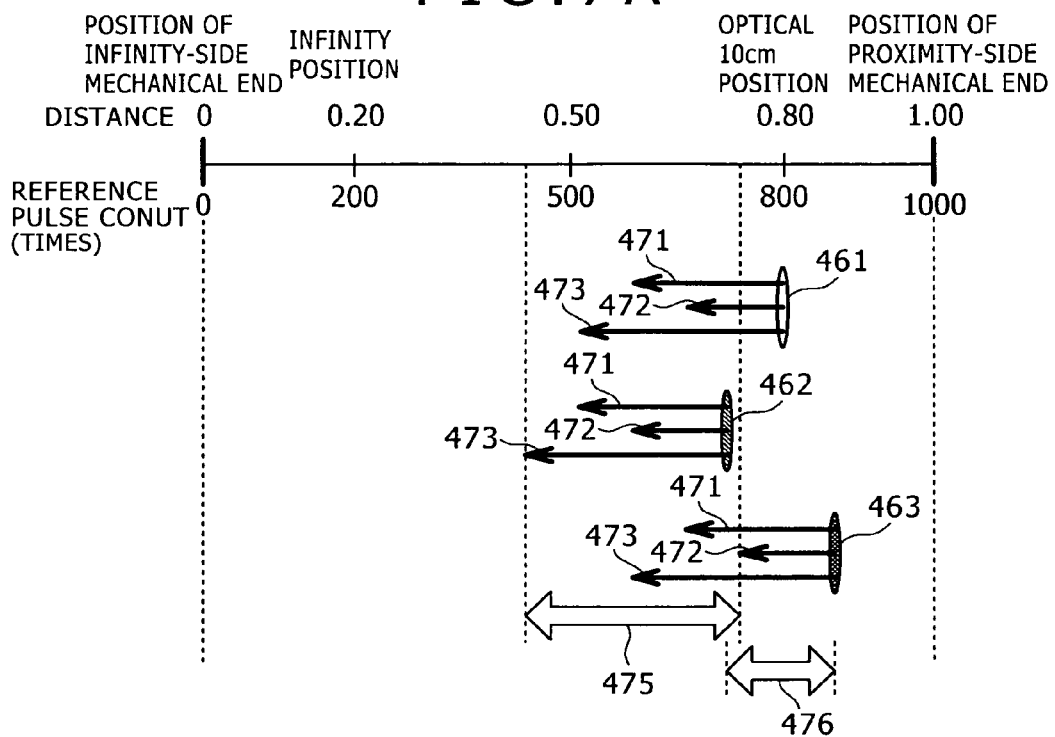
FIGS. 7A and 7B are a plurality of diagrams each showing a model of typical operations carried out by the inferred-lens-position-information updating section to update inferred-lens-position information in accordance with an embodiment of the present disclosure when the focus lens is moved in the direction toward the infinity-side mechanical end.
Figure 7B:
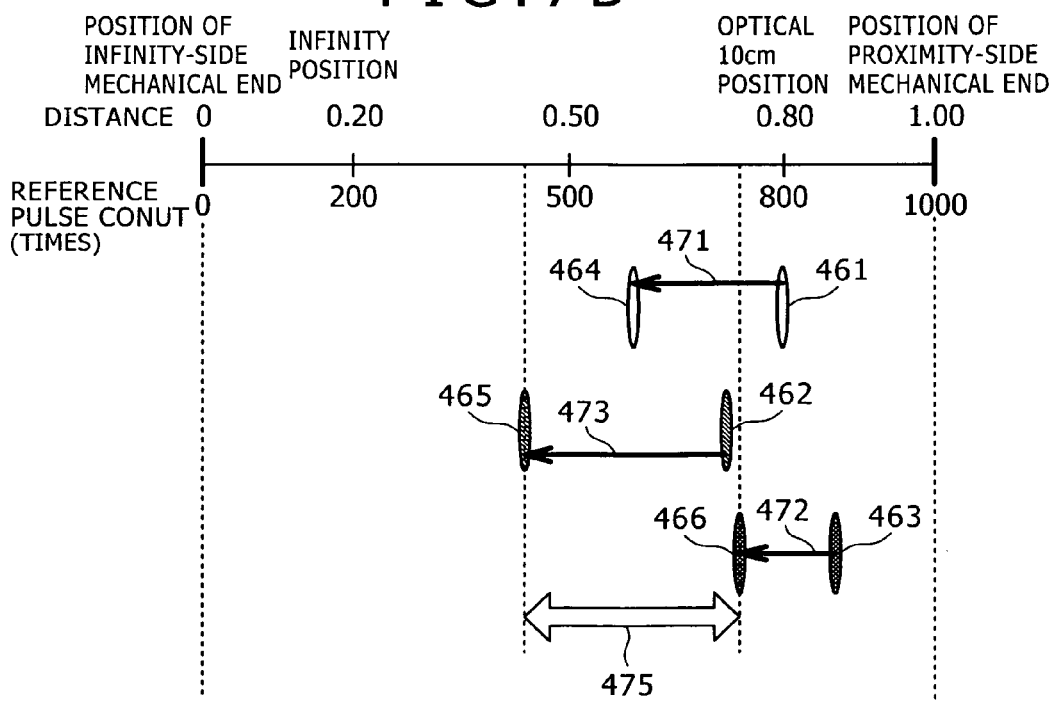

Typical Updating of Inferred-Lens-Position Information After a Movement of the Focus Lens in the Direction to the Infinity Side FIGS. 7A and 7B are a plurality of diagrams each showing a model of typical operations carried out by the inferred-lens-position-information updating section 320 to update inferred-lens-position information in accordance with an embodiment of the present disclosure when the focus lens 220 is moved in the direction toward the infinity-side mechanical end 242.

In this case, the values of the virtual-position information, the infinity-side erroneous-position information and the proximity-side erroneous-position information which are included in the inferred-lens-position information (n−1) prior to the updating operations are assumed to be 800, 714 and 874 respectively. In addition, it is also assumed that, in the model shown in the figure, the driving portion 210 is driven by movement command information used for moving the focus lens 220 in the direction toward the infinity-side mechanical end by expanding or contracting the piezoelectric device 212 200 times.

To be more specific, FIG. 7A shows a virtual position (n−1) 461, an infinity-side erroneous position (n−1) 462 and a proximity-side erroneous position (n−1) 463 which are included in inferred-lens-position information obtained prior to the nth movement made but obtained after the completion of the (n−1)th movement. In addition, for each of the virtual position (n−1) 461, the infinity-side erroneous position (n−1) 462 and the proximity-side erroneous position (n−1) 463, FIG. 7A also shows a requested movement quantity 471, a smallest movement quantity 472 and a largest movement quantity 473 which are movement quantities for the nth movement. On top of that, FIG. 7A also shows a lens-position range (n) 475 which is a range of the position of a destination of the nth movement made by the focus lens 220 as a movement for which errors are taken into consideration. Furthermore, FIG. 7A also shows a lens-position range (n−1) 476 which is a range of the position of a destination of the (n−1)th movement made by the focus lens 220 as a movement for which errors are taken into consideration.

As the lens-position range 455 shown in FIGS. 6A and 6B for the second movement is wider than the lens-position range 435 shown in FIG. 5 for the first movement in the case of the direction toward the proximity-side mechanical end 241, also in the case of the movement made in the direction toward the infinity-side mechanical end 242, the lens-position range (n) 475 shown in FIG. 7A for the nth movement is wider than the lens-position range (n−1) 476 shown in FIG. 7A for the (n−1)th movement. As described above, the lens-position range (n) 475 is a range of an inferred position of the focus lens 220 making the nth movement whereas the lens-position range (n−1) 476 is a range of an inferred position of the focus lens 220 making the (n−1)th movement.

FIG. 7B shows a model of a virtual position (n) 464, an infinity-side erroneous position (n) 465 and a proximity-side erroneous position (n) 466 which are included in inferred-lens-position information updated on the basis of the movement command information for the nth movement in the direction toward the infinity-side mechanical end 242. It is to be noted that items shown in FIG. 7B as items other than the virtual position (n) 464, the infinity-side erroneous position (n) 465 and the proximity-side erroneous position (n) 466 are identical with their respective counterparts shown in FIG. 7A so that the explanation of the identical items is omitted.

By referring to FIGS. 7A and 7B, the following description explains operations to update the inferred-lens-position information for a case in which the nth movement is a movement made by the focus lens 220 in the direction toward the infinity-side mechanical end 242. It is to be noted that the requested movement quantity E, the smallest movement quantity F and the largest movement quantity G which are used in the following description are the same as those used in the equations explained earlier by referring to FIG. 5. Thus, it is not necessary to repeat the explanation of the requested movement quantity E, the smallest movement quantity F and the largest movement quantity G.

First of all, an operation to update the virtual-position information is explained as follows. Since the virtual-position information is information on the position of focus lens 220 driven in the reference usage environment, the virtual-position information is updated after the nth movement made in the direction toward the infinity-side mechanical end 242 by subtracting the requested movement quantity specified for the nth movement from the virtual-position information (n−1) obtained for the (n−1)th movement.

To be more specific, when the focus lens 220 is moved in the direction toward the infinity-side mechanical end 242, the virtual-position information $S_n$ is computed in accordance with Eq. (9) given as follows.

$$S_n = S_{n-1} - E \tag{9}$$

As is obvious from the above equation, when the focus lens 220 is moved in the direction toward the infinity-side mechanical end 242, the virtual-position information $S_n$ is updated by subtracting the requested movement quantity E from the virtual-position information $S_{n-1}$ obtained so far.

The requested movement quantity E is a pulse count specified in the movement command information. That is to say, in the case of the model shown in the figure, the virtual-position information $S_{n-1}$ has a value of 800 whereas the requested movement quantity E has a value of 200. Thus, the virtual-position information $S_n$ which is computed by subtracting the requested movement quantity E from the virtual-position information $S_{n-1}$ is found to be 600 (=800−200).

Next, an operation to update the infinity-side erroneous-position information is explained as follows.

Since the infinity-side erroneous-position information is defined as information on a lens position closest to the infinity-side mechanical end 242, when the focus lens 220 is moved in the direction toward the infinity-side mechanical end 242, the infinity-side erroneous-position information is found to be information on the lens position closest to the infinity-side mechanical end 242. That is to say, when the focus lens 220 is moved in the direction toward the infinity-side mechanical end 242, the infinity-side erroneous-position information $I_n$ is computed in accordance with Eq. (10) given as follows.

$$I_n = I_{n-1} - G \tag{10}$$

As is obvious from the above equation, when the focus lens 220 is moved in the direction toward the infinity-side mechanical end 242, the infinity-side erroneous-position information $I_n$ is updated by subtracting the largest movement quantity G from the infinity-side erroneous-position information $I_{n-1}$ obtained so far.

Next, an operation to update the proximity-side erroneous-position information is explained as follows.

Since the proximity-side erroneous-position information is defined as information on a lens position closest to the proximity-side mechanical end 241, when the focus lens 220 is moved in the direction toward the infinity-side mechanical end 242, the proximity-side erroneous-position information is found to be information on the lens position farthest from the infinity-side mechanical end 242. That is to say, when the focus lens 220 is moved in the direction toward the infinity-side mechanical end 242, the proximity-side erroneous-position information $M_n$ is computed in accordance with Eq. (11) given as follows.

$$M_n = M_{n-1} - F \tag{11}$$

As is obvious from the above equation, when the focus lens 220 is moved in the direction toward the infinity-side mechanical end 242, the proximity-side erroneous-position information $M_n$ is updated by subtracting the smallest movement quantity F from the proximity-side erroneous-position information $M_{n-1}$ obtained so far.

As described above, if the nth movement is a movement made in the direction toward the infinity-side mechanical end 242, the virtual-position information, the infinity-side erroneous-position information and the proximity-side erroneous-position information which are included in the inferred-lens-position information are updated on the basis of Eqs. (9), (10) and (11) respectively. It is to be noted that, if the direction of the movement is the direction toward the infinity-side mechanical end 242, the virtual-position information, the infinity-side erroneous-position information and the proximity-side erroneous-position information which are included in the inferred-lens-position information are updated on the basis of Eqs. (9), (10) and (11) respectively without regard to whether the movement is the (n−1)th movement, the nth movement or any subsequent movement following the nth movement.

Typical Updating of the Inferred-Lens-Position Information

FIG. 8 is a table showing a model of operations carried out by the inferred-lens-position-information updating section 320 to update the inferred-lens-position information in accordance with an embodiment of the present disclosure. That is to say, the contents of the table shown in FIG. 8 are a summary of what have been described by referring to FIGS. 5 to 7B. Thus, the detailed explanation of the table is omitted.

As shown in the first row of FIG. 8, when the focus lens 220 is moved in the direction toward the proximity-side mechanical end 241, the virtual-position information is updated by adding the requested movement quantity to the virtual-position information obtained so far. In addition, in this case, the infinity-side erroneous-position information is updated by adding the smallest movement quantity to the infinity-side erroneous-position information obtained so far whereas the proximity-side erroneous-position information is updated by adding the largest movement quantity to the proximity-side erroneous-position information obtained so far.

Also as shown in the second row of FIG. 8, when the focus lens 220 is moved in the direction toward the infinity-side mechanical end 242, on the other hand, the virtual-position information is updated by subtracting the requested movement quantity from the virtual-position information obtained so far. In addition, in this case, the infinity-side erroneous-position information is updated by subtracting the largest movement quantity from the infinity-side erroneous-position information obtained so far whereas the proximity-side erroneous-position information is updated by subtracting the smallest movement quantity from the proximity-side erroneous-position information obtained so far.

That is to say, the information on the erroneous position (a limit of the position range) on the side toward which the focus lens 220 is moved is updated by adding or subtracting the largest movement quantity. On the other hand, the information on the erroneous position (another limit of the position range) on a side opposite to the side toward which the focus lens 220 is moved is updated by adding or subtracting the smallest movement quantity. In this way, the method for updating the inferred-lens-position information is changed in accordance with the direction of a movement made by the focus lens 220. It is thus possible to compute the range of the position of the focus lens 220 as a range with movement-quantity errors properly taken into consideration.

Typical Movements of the Focus Lens to Mechanical Ends

Figure 9A:
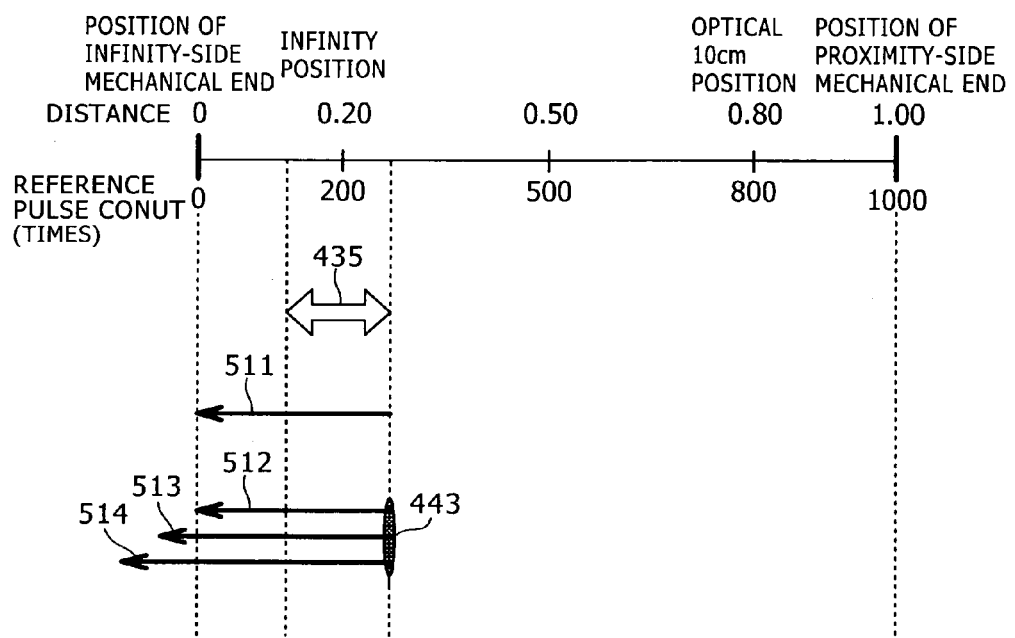
FIGS. 9A and 9B are a plurality of diagrams each showing a model of a typical case in which the focus lens is moved to a mechanical end as requested by mechanical-end-destined movement command information generated by the mechanical-end-destined movement command information computation section 330 on the basis of inferred-lens-position information in accordance with an embodiment of the present disclosure.
Figure 9B:
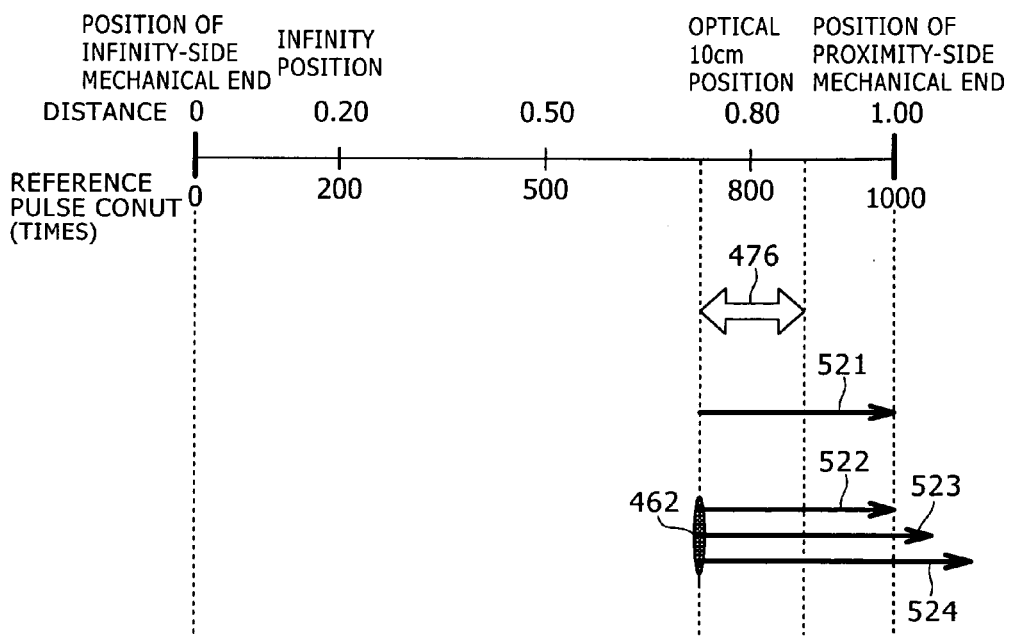

FIGS. 9A and 9B are a plurality of diagrams each showing a model of a typical case in which the focus lens 220 is moved to a mechanical end as requested by mechanical-end-destined movement command information generated by the mechanical-end-destined movement command information computation section 330 on the basis of inferred-lens-position information in accordance with an embodiment of the present disclosure.

To be more specific, FIG. 9A shows a model of a typical method for computing the pulse count included in the movement command information for a case in which the focus lens 220 is brought into contact with the infinity-side mechanical end 242. To put it concretely, the model shown in FIG. 9A includes a lens-position range 435 and a proximity-side erroneous position 443. The lens-position range 435 is a range of an inferred position of the focus lens 220. In addition, the model shown in FIG. 9A also includes a required movement quantity 511 which is a smallest necessary movement quantity required for bringing the focus lens 220 currently located at a position in the lens-position range 435 into contact with the infinity-side mechanical end 242. To be more specific, the required movement quantity 511 is a movement quantity required for bringing the focus lens 220 currently located at the proximity-side erroneous position 443 into contact with the infinity-side mechanical end 242. On top of that, the model shown in FIG. 9A also includes a smallest movement quantity 512, a requested movement quantity 513 and a largest movement quantity 514 which are taken into consideration in the computation to find the pulse count included in the movement command information on the basis of the required movement quantity 511.

It is to be noted that, in the model shown in the figure, the proximity-side erroneous-position information shown as the proximity-side erroneous position 443 is assumed to have a value of 286. In addition, as described in the explanation of Eqs. (5) and (7), the effect of the posture is assumed to result in a movement-quantity error of up to ±10% whereas the effect of the temperature is assumed to result in a movement-quantity error of up to ±30%.

By referring to FIG. 9A, the following description explains an operation to compute the pulse count included in the movement command information for bringing the focus lens 220 currently located at a position in the lens-position range 435 into contact with the infinity-side mechanical end 242.

First of all, on the basis of the inferred-lens-position information held by the inferred-lens-position-information holding section 340, the mechanical-end-destined movement command information computation section 330 computes a movement quantity for bringing the focus lens 220 into contact with the infinity-side mechanical end 242. In order to bring the focus lens 220 currently located at a position indicated by the inferred-lens-position information as a position in the lens-position range 435 into contact with the infinity-side mechanical end 242 with absolute certainty, it is necessary to move the focus lens 220 by a distance from a position farthest away from the infinity-side mechanical end 242 to the position of the infinity-side mechanical end 242. To put it concretely, it is necessary to move the focus lens 220 by a distance from the proximity-side erroneous position 443 indicated by the proximity-side erroneous-position information to the position of the infinity-side mechanical end 242. This distance corresponds to the required movement quantity 511 required for the movement.

The required movement quantity 511 corresponding to the required movement distance from the proximity-side erroneous position 443 indicated by the proximity-side erroneous-position information to the position of the infinity-side mechanical end 242 is referred to as a required movement quantity $B_I$ which is a required movement quantity expressed in terms of reference pulses by typically Eq. (12) given as follows.

$$B_I = M - V \qquad (12)$$

Notation M used in the above equation denotes a proximity-side erroneous position indicated by the proximity-side erroneous-position information included in the inferred-lens-position information which is supplied when the required movement quantity $B_I$ is computed. On the other hand, notation V denotes a position expressed in terms of reference pulses as the position of the infinity-side mechanical end 242. In the case of the embodiments of the present disclosure, the position of the infinity-side mechanical end 242 is expressed by a reference pulse count of 0.

That is to say, in the case of the model shown in FIG. 9A, the required movement quantity $B_I$ computed in accordance with Eq. (12) is 286.

Next, the following description explains computation to find the pulse count of the movement command information on the basis of the required movement quantity $B_I$.

The movement made by the focus lens 220 along a distance indicated by the required movement quantity $B_I$ is also affected by the usage environment represented by the temperature, the posture and the like. Thus, also in the operation to compute the pulse count of the movement command information on the basis of the required movement quantity $B_I$, it is necessary to take the effects of the usage environment into consideration. It is to be noted that the pulse count of the movement command information has the same value as the reference pulse count used to represent the requested movement quantity for a case in which the focus lens 220 has moved as requested by the command of the movement command information. That is to say, a pulse count $D_I$ included in the movement command information to represent the number of pulses required for moving the focus lens 220 from the position indicated by the proximity-side erroneous-position information to the position of the infinity-side mechanical end 242 is found by computing a pulse count for a case in which the required movement quantity $B_I$ is equal to the smallest movement quantity. The pulse count for a case in which the required movement quantity $B_I$ is equal to the smallest movement quantity is the number of pulses required for moving the focus lens 220 by the required movement quantity $B_I$ for a case in which a movement caused by one expansion or one contraction is a shortest movement.

The aforementioned pulse count $D_I$ included in the movement command information to represent the number of pulses required for moving the focus lens 220 from the proximity-side erroneous position indicated by the proximity-side erroneous-position information to the position of the infinity-side mechanical end 242 is computed in accordance with Eq. (13) as follows:

$$D_I = B_I / C_{min} \quad (13)$$

The smallest movement quantity computation coefficient $C_{min}$ used in the above equation is the same as that explained before by referring to other equations such as Eqs. (4) and (5).

That is to say, as shown by Eq. (13), the pulse count $D_I$ included in the movement command information is found by computing a pulse count for a case in which the required movement quantity $B_I$ is equal to the smallest movement quantity. For a case in which the value of the required movement quantity $B_I$ is 286 whereas the value of the smallest movement quantity computation coefficient $C_{min}$ is 0.63, the pulse count $D_I$ computed in accordance with Eq. (13) as the pulse count included in the movement command information is 454 which is obtained finally by truncation of the fraction part of the computation result. It is to be noted that, in the model shown in FIG. 9A, the required movement quantity $B_I$ corresponds to the required movement quantity 511 whereas the pulse count $D_I$ included in the movement command information corresponds to the requested movement quantity 513.

As described above, when the focus lens 220 is brought into contact with the infinity-side mechanical end 242, the pulse count $D_I$ included in the movement command information is computed on the basis of the proximity-side erroneous-position information and the smallest movement quantity computation coefficient $C_{min}$. This computed pulse count $D_I$ included in the movement command information can be used for bringing the focus lens 220 into contact with the infinity-side mechanical end 242 even if the movement quantity is a smallest movement quantity as shown by the smallest movement quantity 512 in FIG. 9A. If the movement quantity is a largest movement quantity, on the other hand, an excessive movement quantity is generated beyond the position of the infinity-side mechanical end 242 as indicated by the left-side portion of the largest movement quantity 514 shown in FIG. 9A. Since the movement of the focus lens 220 is stopped at the position of the infinity-side mechanical end 242, however, the focus lens 220 can be positioned at the infinity-side mechanical end 242. That is to say, by computing the pulse count $D_I$ included in the movement command information on the basis of the proximity-side erroneous-position information and the smallest movement quantity computation coefficient $C_{min}$, the focus lens 220 can be moved to the infinity-side mechanical end 242 without regard to the usage environment in which the imaging apparatus 100 is used.

It is to be noted that the pieces of information which are included in the inferred-lens-position information are updated to the value of 0 indicating the position of the infinity-side mechanical end 242 when the mechanical-end-destined movement command information computation section 330 supplies the movement command information for bringing the focus lens 220 into contact with the infinity-side mechanical end 242. That is to say, the virtual-position information, the infinity-side erroneous-position information and the proximity-side erroneous-position information are updated to the value of 0.

FIG. 9B shows a model of a typical method for computing the pulse count included in the movement command information for a case in which the focus lens 220 is brought into contact with the proximity-side mechanical end 241. To put it concretely, the model shown in FIG. 9B includes a lens-position range 476 and an infinity-side erroneous position 462. The lens-position range 476 is a range of an inferred position of the focus lens 220. In addition, the model shown in FIG. 9B also includes a required movement quantity 521 which is a smallest necessary movement quantity required for bringing the focus lens 220 currently located at a position in the lens-position range 476 into contact with the proximity-side mechanical end 241. To be more specific, the required movement quantity 521 is a movement quantity required for bringing the focus lens 220 currently located at the infinity-side erroneous position 462 into contact with the proximity-side mechanical end 241. On top of that, the model shown in FIG. 9A also includes a smallest movement quantity 522, a requested movement quantity 523 and a largest movement quantity 524 which are taken into consideration in an operation to compute the pulse count included in the movement command information on the basis of the required movement quantity 521.

It is to be noted that, in the model shown in FIG. 9B, the infinity-side erroneous-position information shown as the infinity-side erroneous position 462 is assumed to have a value of 714. In addition, as described in the explanation with reference to FIG. 9A, the effect of the posture is assumed to result in a movement-quantity error of up to ±10% whereas the effect of the temperature is assumed to result in a movement-quantity error of up to ±30%.

By referring to FIG. 9B, the following description explains an operation to compute the pulse count included in the movement command information for bringing the focus lens 220 currently located at a position in the lens-position range 476 into contact with the proximity-side mechanical end 241.

The flow of the operation to compute the pulse count included in the movement command information for bringing the focus lens 220 currently located at a position in the lens-position range 476 into contact with the proximity-side mechanical end 241 is the same as the flow of the operation to compute the pulse count included in the movement command information for bringing the focus lens 220 currently located at a position in the lens-position range 435 into contact with the infinity-side mechanical end 242 as explained earlier by referring to FIG. 9A. That is to say, first of all, the required movement quantity 521 required for moving the focus lens 220 from the infinity-side erroneous position 462 to the proximity-side mechanical end 241 is computed. The required movement quantity 521 corresponds to the distance from the infinity-side erroneous position 462 to the proximity-side mechanical end 241 whereas the infinity-side erroneous position 462 is a lens position farthest away from the proximity-side mechanical end 241. Then, on the basis of the computed distance, the pulse count included in the movement command information is found.

The required movement quantity 521 corresponding to the required movement distance from the infinity-side erroneous position 462 indicated by the infinity-side erroneous-position information to the position of the proximity-side mechanical end 241 is referred to as a required movement quantity $B_M$ which is a required movement quantity expressed in terms of reference pulses by typically Eq. (14) given as follows.

$$B_M = W - I \quad (14)$$

Notation I used in the above equation denotes an infinity-side erroneous position indicated by the infinity-side erroneous-position information included in the inferred-lens-position information which is supplied when the required movement quantity $B_M$ is computed. On the other hand, notation W denotes a position expressed in terms of reference pulses as the position of the proximity-side mechanical end 241. In the case of the embodiments of the present disclosure, the position of the proximity-side mechanical end 241 is expressed by a reference pulse count of 1,000.

That is to say, in the case of the model shown in FIG. 9B, the required movement quantity $B_M$ computed in accordance with Eq. (14) is 286.

The pulse count $D_M$ included in the movement command information to represent the number of pulses required for moving the focus lens 220 from the infinity-side erroneous position indicated by the infinity-side erroneous-position information to the position of the proximity-side mechanical end 241 is computed in accordance with Eq. (15) as follows:

$$D_M = B_M / C_{min} \quad (15)$$

That is to say, as shown by Eq. (15), the pulse count $D_M$ included in the movement command information is found by computing a pulse count for a case in which the required movement quantity $B_M$ is equal to the smallest movement quantity. For a case in which the value of the required movement quantity $B_M$ is 286 whereas the value of the smallest movement quantity computation coefficient $C_{min}$ is 0.63, the pulse count $D_M$ computed in accordance with Eq. (15) as the pulse count included in the movement command information is 454 which is obtained finally by truncation of the fraction part of the computation result. It is to be noted that, in the model shown in FIG. 9B, the required movement quantity $B_M$ corresponds to the required movement quantity 521 whereas the pulse count $D_M$ included in the movement command information corresponds to the requested movement quantity 523.

As described above, when the focus lens 220 is brought into contact with the proximity-side mechanical end 241, the pulse count $D_M$ included in the movement command information is computed on the basis of the infinity-side erroneous-position information and the smallest movement quantity computation coefficient $C_{min}$.

It is to be noted that the pieces of information which are included in the inferred-lens-position information are updated to the value of 1,000 indicating the position of the proximity-side mechanical end 241 when the mechanical-end-destined movement command information computation section 330 supplies the movement command information for bringing the focus lens 220 into contact with the proximity-side mechanical end 241.

Typical Comparison of Focus-Lens Movements to a Mechanical End

Figure 10A:
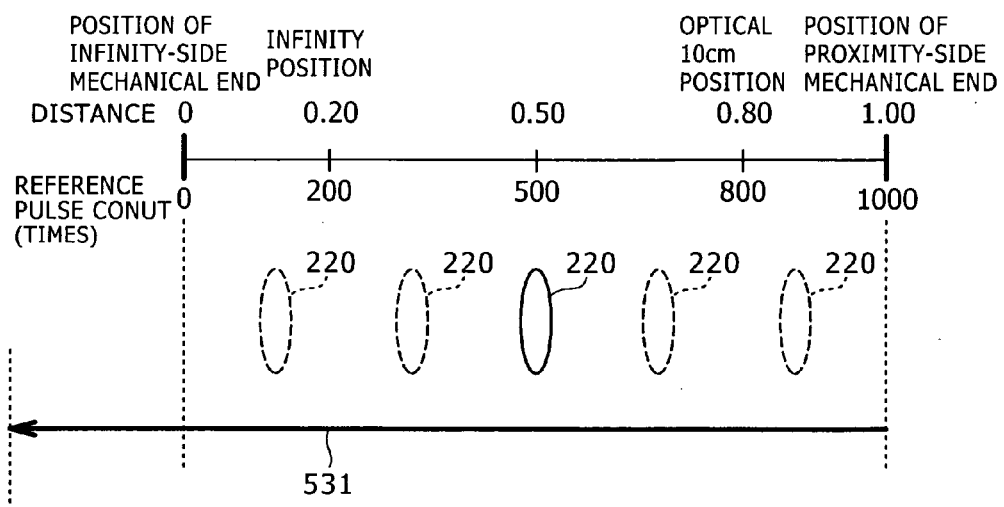
FIGS. 10A and 10B are a plurality of model diagrams comparing a movement made toward a mechanical end in accordance with mechanical-end-destined movement command information generated by the mechanical-end-destined movement command information computation section in an embodiment of the present disclosure with the same movement made toward a mechanical end in the related-art imaging apparatus having no sensor for detecting the position of the lens.
Figure 10B:
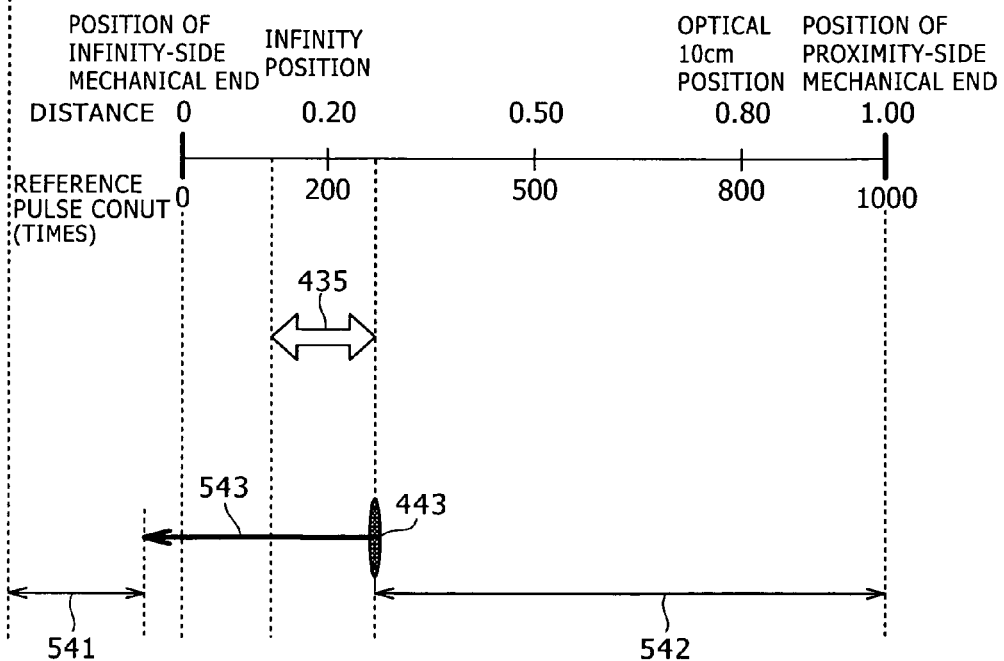

FIGS. 10A and 10B are a plurality of model diagrams comparing a movement made toward a mechanical end in accordance with mechanical-end-destined movement command information generated by the mechanical-end-destined movement command information computation section 330 in an embodiment of the present disclosure with the same movement made toward a mechanical end in the related-art imaging apparatus having no sensor for detecting the position of the lens.

To be more specific, FIG. 10A shows a model of a movement made by the focus lens 220 in the direction toward the infinity-side mechanical end 242 in the related-art imaging apparatus having no sensor for detecting the position of the focus lens 220. To put it concretely, FIG. 10A shows the unknown positions of the focus lens 220 and a mechanical-end-destined movement requested quantity 531 which is an arrow serving as a model of the pulse count included in the movement command information supplied to bring the focus lens 220 into contact with the infinity-side mechanical end 242 in the related-art imaging apparatus.

In the related-art imaging apparatus having no sensor for detecting the position of the focus lens 220, as shown in FIG. 10A, the information on the position of the focus lens 220 does not include errors caused by, among others, posture and temperature changes. Thus, the information on the position of the focus lens 220 is not reliable when the information is used for moving the focus lens 220 to a mechanical end. In order to solve this problem, it is necessary to make the same movement as the full-stroke movement made by the imaging apparatus 100 according to an embodiment as explained earlier by referring to FIG. 4A. In this way, the focus lens 220 can be brought into contact with the mechanical end with absolute certainty.

That is to say, every time the focus lens 220 is brought into contact with a mechanical end, in the related-art imaging apparatus, the focus lens 220 is driven on the basis of a mechanical-end-destined movement requested quantity 531 which is movement command information for driving the focus lens 220 to make a full-stroke movement.

On the other hand, FIG. 10B shows a model of a movement made by the focus lens 220 in the direction toward the infinity-side mechanical end 242 in accordance with an embodiment of the present disclosure. FIG. 10B shows the lens-position range 435 and the proximity-side erroneous position 443 which are also shown in FIG. 9A. In addition, FIG. 10B also shows a mechanical-end-destined movement requested quantity 543 equivalent to the requested movement quantity 513 shown in FIG. 9A. On top of that, FIG. 10B also shows an arrow 541 representing an infinity-side difference between the mechanical-end-destined movement requested quantity 543 and the mechanical-end-destined movement requested quantity 531 shown in FIG. 10A and an arrow 542 representing a proximity-side difference between the mechanical-end-destined movement requested quantity 543 and the mechanical-end-destined movement requested quantity 531.

Since the mechanical-end-destined movement command information computation section 330 computes the pulse count included in the movement command information for the movement to a mechanical end on the basis of the inferred-lens-position information, as shown in FIG. 10B, the computed pulse count represented by the mechanical-end-destined movement requested quantity 543 can be made small in comparison with a pulse count represented by the mechanical-end-destined movement requested quantity 531 shown in FIG. 10A.

Typical Focus-Lens Position Management Operations of the Imaging Apparatus

Next, by referring to diagrams, the following description explains typical operations carried out by the imaging apparatus 100 as focus-lens position management operations according to an embodiment of the present disclosure.

Figure 11:
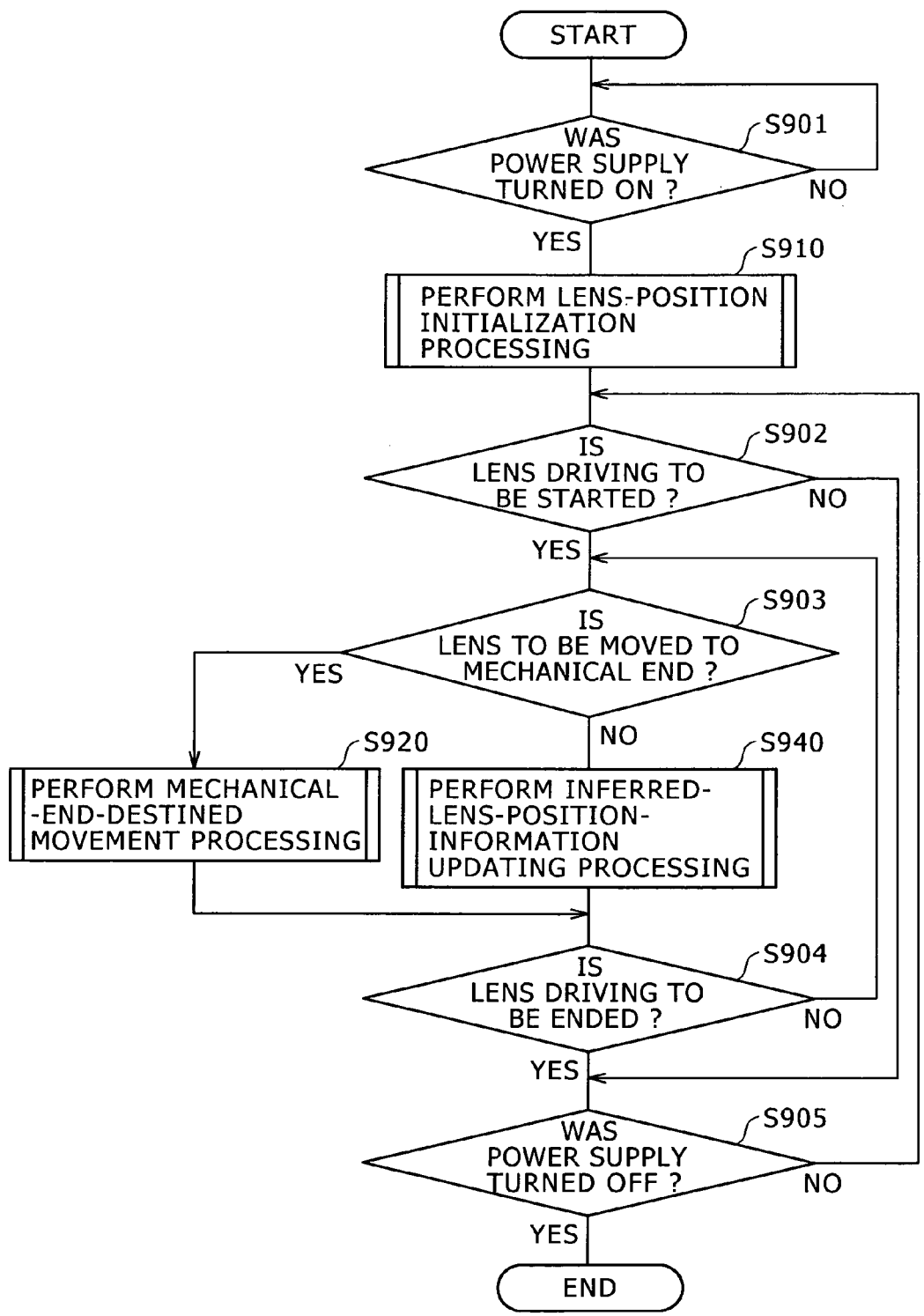
FIG. 11 shows a flowchart representing a typical focus-lens position management processing procedure followed by the imaging apparatus to carry out focus-lens position management operations according to the embodiment of the present disclosure.

FIG. 11 shows a flowchart representing a typical focus-lens position management processing procedure followed by the imaging apparatus 100 to carry out the focus-lens position management operations according to the embodiment of the present disclosure.

As shown in the figure, the flowchart begins with a step S901 at which the control section 192 determines whether or not the power supply of the camera head block 110 and the image processing chip 140 has been turned on. If the control section 192 determines at the step S901 that the power supply has not been turned on, the flow of the procedure goes back to the step S901 in order to repeat the determination. As a matter of fact, the control section 192 carries out the determination repeatedly at the step S901 in a state of waiting for the power supply to be turned on.

As the control section 192 determines at the step S901 that the power supply has been turned on, on the other hand, the flow of the procedure goes on to a step S910 at which focus-lens position initialization processing is carried out to bring the focus lens 220 having an unknown position into contact with a mechanical end. It is to be noted that the focus-lens position initialization processing carried out at the step S910 will be explained in detail later by referring to a flowchart shown in FIG. 12.

Then, at the next step S902, the control section 192 determines whether or not the lens driving is to be started. If the control section 192 determines at the step S902 that the lens driving is not to be started, the flow of the procedure goes on to a step S905 to be described later.

If the control section 192 determines at the step S902 that the lens driving is to be started, on the other hand, the flow of the procedure goes on to a step S903 at which the lens-driving control block 300 determines whether or not the focus lens 220 is to be moved in a direction toward a mechanical end on the basis of the inferred-lens-position information. If the lens-driving control block 300 determines at the step S903 that the focus lens 220 is to be moved in a direction toward a mechanical end on the basis of the inferred-lens-position information, the flow of the procedure goes on to a step S920 at which mechanical-end-destined movement processing is carried out to move the focus lens 220 to a mechanical end in accordance with the movement command information generated by the mechanical-end-destined movement command information computation section 330. It is to be noted that the mechanical-end-destined movement processing carried out at the step S920 will be explained later in detail by referring to a flowchart shown in FIG. 14. After the mechanical-end-destined movement processing carried out at the step S920 has been completed, the flow of the procedure goes on to a step S904.

If the lens-driving control block 300 determines at the step S903 that the focus lens 220 is not to be moved in a direction toward a mechanical end on the basis of the inferred-lens-position information, on the other hand, the flow of the procedure goes on to a step S940 at which the focus lens 220 is driven whereas inferred-lens-position-information updating processing is carried out to update the inferred-lens-position information. It is to be noted that the inferred-lens-position-information updating processing carried out at the step S940 will be explained later in detail by referring to a flowchart shown in FIG. 13.

Then, at the next step S904, the control section 192 determines whether or not the lens driving is to be terminated. If the control section 192 determines at the step S904 that the lens driving is not to be terminated, the flow of the procedure goes back to the step S903.

If the control section 192 determines at the step S904 that the lens driving is to be terminated, on the other hand, the flow of the procedure goes on to the step S905 at which the control section 192 determines whether or not the power supply has been turned off. If the control section 192 determines at the step S905 that the power supply has not been turned off, the flow of the procedure goes back to the step S902.

If the control section 192 determines at the step S905 that the power supply has been turned off, on the other hand, the focus-lens position management processing procedure is terminated.

Figure 12:
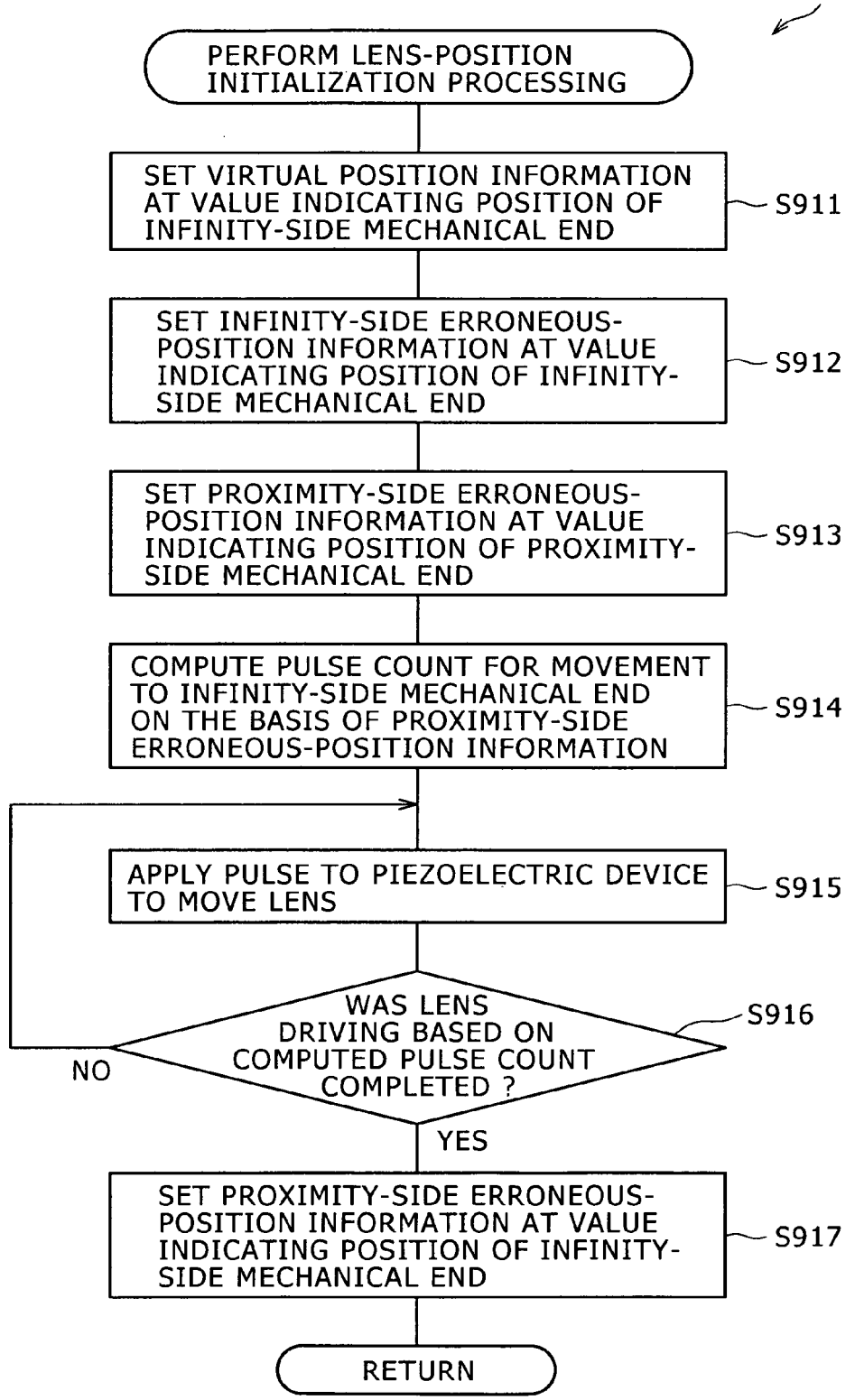
FIG. 12 shows a flowchart representing the procedure of focus-lens position initialization processing carried out at a step S910 of the flowchart representing the focus-lens position management processing procedure according to an embodiment of the present disclosure.

FIG. 12 shows a flowchart representing the procedure of the focus-lens position initialization processing carried out at the step S910 of the flowchart representing the focus-lens position management processing procedure according to an embodiment of the present disclosure.

It is to be noted that, in the focus-lens position management processing procedure represented by the flowchart shown in FIG. 12, the mechanical end with which the focus lens 220 is to be brought into contact is assumed to be the infinity-side mechanical end 242.

As shown in the figure, the flowchart begins with a step S911 at which the virtual-position information included in the inferred-lens-position information is set at a value indicating the position of the infinity-side mechanical end 242. Then, at the next step S912, the infinity-side erroneous-position information included in the inferred-lens-position information is set at the value indicating the position of the infinity-side mechanical end 242. Subsequently, at the next step S913, the proximity-side erroneous-position information included in the inferred-lens-position information is set at the value indicating the position of the proximity-side mechanical end 241.

Then, at the next step S914, on the basis of the proximity-side erroneous-position information and the information on errors, the pulse count included in the movement command information for the movement to the infinity-side mechanical end 242 is computed. This pulse count is the number of pulses to be applied to the piezoelectric device 212. Since the proximity-side erroneous-position information has been set at the value indicating the position of the proximity-side mechanical end 242, the pulse count included in the movement command information for driving the focus lens 220 to make a full-stroke movement is computed at the step S914.

Subsequently, at the next step S915, the piezoelectric-device driver 211 applies the first one of pulses, the number of which is specified by the pulse count, to the piezoelectric device 212 on the basis of the movement command information supplied to the piezoelectric-device driver 211 as the movement command information including the pulse count so that the piezoelectric device 212 moves the focus lens 220 in the direction toward the infinity-side mechanical end 242. Then, the flow of the procedure goes on to the next step S916 in order to determine whether or not the operation to drive the focus lens 220 on the basis of the pulse count included in the movement command information has been completed. In order to determine whether or not the operation to drive the focus lens 220 on the basis of the pulse count included in the movement command information has been completed, the piezoelectric-device driver 211 counts the number of pulses applied so far to the piezoelectric device 212 and determines whether or not the number of pulses applied so far to the piezoelectric device 212 has attained the pulse count included in the movement command information. If the operation to drive the focus lens 220 on the basis of the pulse count included in the movement command information is determined at the step S916 to have not been completed, the flow of the procedure goes back to the step S915 in order to apply the next pulse to the piezoelectric device 212 and, then, to the step S916 in order to repeat the determination. As a matter of fact, the processing of the steps S915 and S916 is carried out repeatedly in a state of waiting for the operation to drive the focus lens 220 to be completed.

As the operation to drive the focus lens 220 on the basis of the pulse count included in the movement command information is determined at the step S916 to have been completed, on the other hand, the flow of the procedure goes on to a step S917 at which the proximity-side erroneous-position information is set at a value indicating the position of the infinity-side mechanical end 242.

It is to be noted that the steps S911 to S913 of the lens-position initialization processing are carried out by the full-stroke movement control section 350 on the basis of a full-stroke instruction received from the control section 192. On the other hand, the steps S914 to S917 of the lens-position initialization processing are carried out by the mechanical-end-destined movement command information computation section 330.

Figure 13:
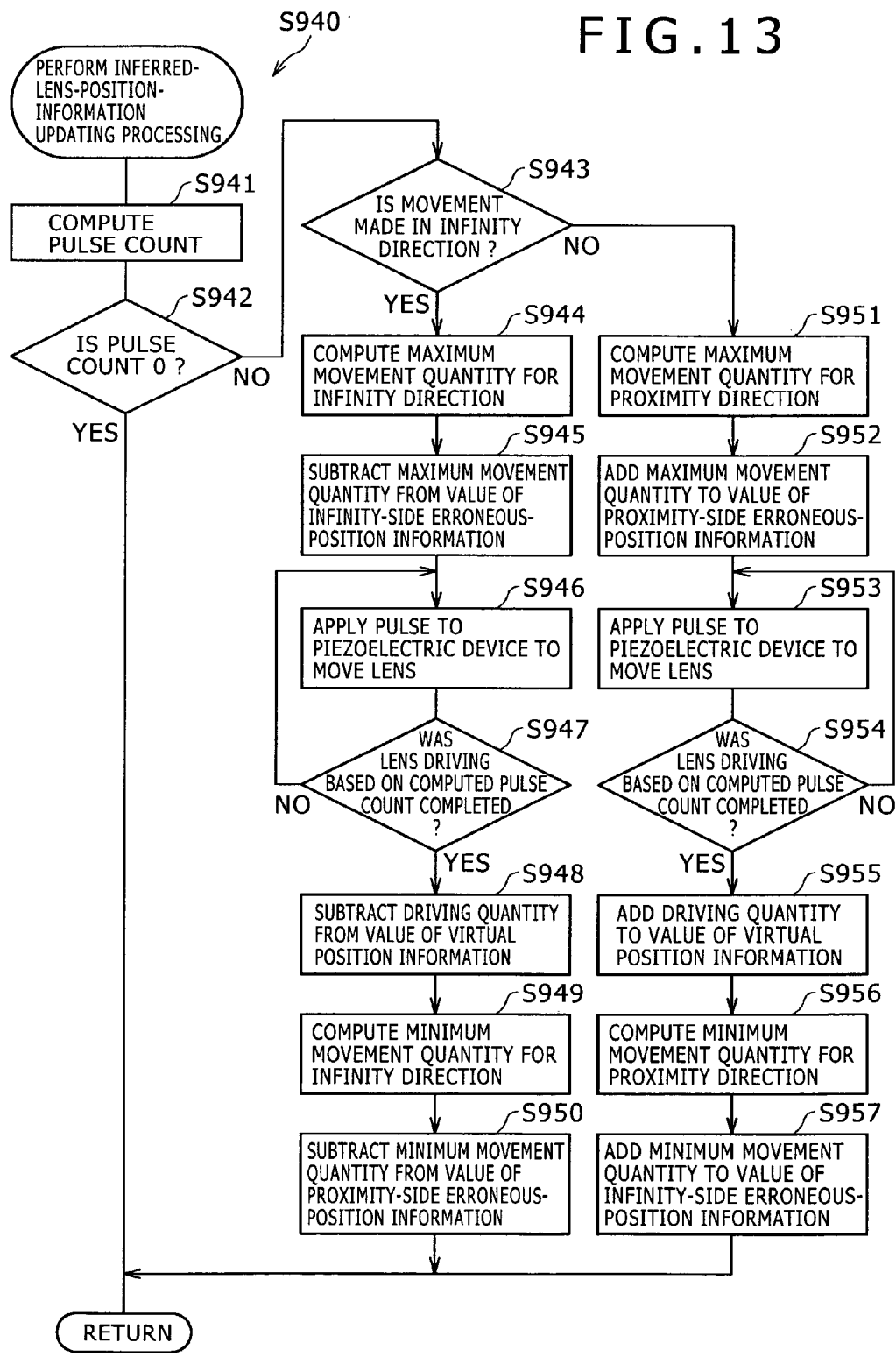
FIG. 13 shows a flowchart representing the procedure of inferred-lens-position-information updating processing carried out at a step S940 of the flowchart representing the focus-lens position management processing procedure according to an embodiment of the present disclosure.

FIG. 13 shows a flowchart representing the procedure of the inferred-lens-position-information updating processing carried out at the step S940 of the flowchart representing the focus-lens position management processing procedure according to an embodiment of the present disclosure.

The flowchart shown in FIG. 13 begins with a step S941 at which the movement-command-information computation section 310 computes the pulse count included in the movement command information supplied to the driving portion 210 on the basis of movement quantities for the auto-focus and manual operations. Then, at the next step S942, the inferred-lens-position-information updating section 320 receiving the movement command information determines whether or not the computed pulse count is equal to 0. If the inferred-lens-position-information updating section 320 determines at the step S942 that the computed pulse count is equal to 0, the inferred-lens-position-information updating processing is terminated.

If the inferred-lens-position-information updating section 320 determines at the step S942 that the computed pulse count is not equal to 0, on the other hand, the flow of the procedure goes on to a step S943 at which the inferred-lens-position-information updating section 320 determines whether or not the direction of the movement made by the focus lens 220 is the direction toward the infinity-side mechanical end 242 on the basis of the movement command information supplied to the inferred-lens-position-information updating section 320. If the inferred-lens-position-information updating section 320 determines at the step S943 that the direction of the movement made by the focus lens 220 is the direction toward the infinity-side mechanical end 242, the flow of the procedure goes on to a step S944 at which, on the basis of the pulse count included in the movement command information and the information on errors, the inferred-lens-position-information updating section 320 computes the largest movement quantity for the movement made in the direction toward the infinity-side mechanical end 242.

Then, at the next step S945, the computed largest movement quantity is subtracted from the value of the infinity-side erroneous-position information included in the inferred-lens-position information. Subsequently, at the next step S946, the piezoelectric-device driver 211 applies the first one of pulses, the number of which is specified by the pulse count, to the piezoelectric device 212 on the basis of the movement command information supplied from the movement-command-information computation section 310 as the movement command information including the pulse count so that the piezoelectric device 212 moves the focus lens 220 in the direction toward the infinity-side mechanical end 242. Then, the flow of the procedure goes on to the next step S947 in order to determine whether or not the operation to drive the focus lens 220 on the basis of the pulse count computed at the step S941 as the pulse count of the movement command information has been completed. In order to determine whether or not the operation to drive the focus lens 220 on the basis of the pulse count included in the movement command information has been completed, the piezoelectric-device driver 211 counts the number of pulses applied so far to the piezoelectric device 212 and determines whether or not the number of pulses applied so far to the piezoelectric device 212 has attained the pulse count included in the movement command information. If the operation to drive the focus lens 220 on the basis of the pulse count included in the movement command information is determined at the step S947 to have not been completed, the flow of the procedure goes back to the step S946 in order to apply the next pulse to the piezoelectric device 212 and, then, to the step S947 in order to repeat the determination. As a matter of fact, the processing of the steps S946 and S947 is carried out repeatedly in a state of waiting for the operation to drive the focus lens 220 to be completed.

As the operation to drive the focus lens 220 on the basis of the pulse count included in the movement command information is determined at the step S947 to have been completed, on the other hand, the flow of the procedure goes on to a step S948 at which a value corresponding to the pulse count included in the movement command information is subtracted from the value of the virtual-position information included in the inferred-lens-position information. Then, at the next step S949, on the basis of the pulse count computed at the step S941 as the pulse count of the movement command information and the information on errors, the inferred-lens-position-information updating section 320 computes the smallest movement quantity for the movement made in the direction toward the infinity-side mechanical end 242. Subsequently, at the next step S950, the computed smallest movement quantity is subtracted from the value of the proximity-side erroneous-position information included in the inferred-lens-position information.

If the inferred-lens-position-information updating section 320 determines at the step S943 that the direction of the movement made by the focus lens 220 is not the direction toward the infinity-side mechanical end 242, on the other hand, the flow of the procedure goes on to a step S951 at which, on the basis of the pulse count included in the movement command information and the information on errors, the inferred-lens-position-information updating section 320 computes the largest movement quantity for the movement made in the direction toward the proximity-side mechanical end 241. Then, at the next step S952, the computed largest movement quantity is added to the value of the proximity-side erroneous-position information included in the inferred-lens-position information.

Subsequently, at the next step S953, the piezoelectric-device driver 211 applies the first one of pulses, the number of which is specified by the pulse count, to the piezoelectric device 212 on the basis of the movement command information supplied from the movement-command-information computation section 310 as the movement command information including the pulse count so that the piezoelectric device 212 moves the focus lens 220 in the direction toward the proximity-side mechanical end 241. Then, the flow of the procedure goes on to the next step S954 in order to determine whether or not the operation to drive the focus lens 220 on the basis of the pulse count computed at the step S941 as the pulse count of the movement command information has been completed. In order to determine whether or not the operation to drive the focus lens 220 on the basis of the pulse count included in the movement command information has been completed, the piezoelectric-device driver 211 counts the number of pulses applied so far to the piezoelectric device 212 and determines whether or not the number of pulses applied so far to the piezoelectric device 212 has attained the pulse count included in the movement command information. If the operation to drive the focus lens 220 on the basis of the pulse count included in the movement command information is determined at the step S954 to have not been completed, the flow of the procedure goes back to the step S953 in order to apply the next pulse to the piezoelectric device 212 and, then, to the step S954 in order to repeat the determination. As a matter of fact, the processing of the steps S953 and S954 is carried out repeatedly in a state of waiting for the operation to drive the focus lens 220 to be completed.

It is to be noted that the steps S946 and S953 are each a typical command supplying procedure mentioned in a claim of this specification of the present disclosure.

As the operation to drive the focus lens 220 on the basis of the pulse count included in the movement command information is determined at the step S954 to have been completed, on the other hand, the flow of the procedure goes on to a step S955 at which a value corresponding to the pulse count included in the movement command information is added to the value of the virtual-position information included in the inferred-lens-position information. Then, at the next step S956, on the basis of the pulse count computed at the step S941 as the pulse count of the movement command information and the information on errors, the inferred-lens-position-information updating section 320 computes the smallest movement quantity for the movement made in the direction toward the proximity-side Mechanical end 241. Subsequently, at the next step S957, the computed smallest movement quantity is added to the value of the infinity-side erroneous-position information included in the inferred-lens-position information.

It is to be noted that the steps S944, S945, S948 to S950, S951, S952 and S955 to S957 are a typical position inference procedure cited in a claim of this specification or the present disclosure.

Figure 14:
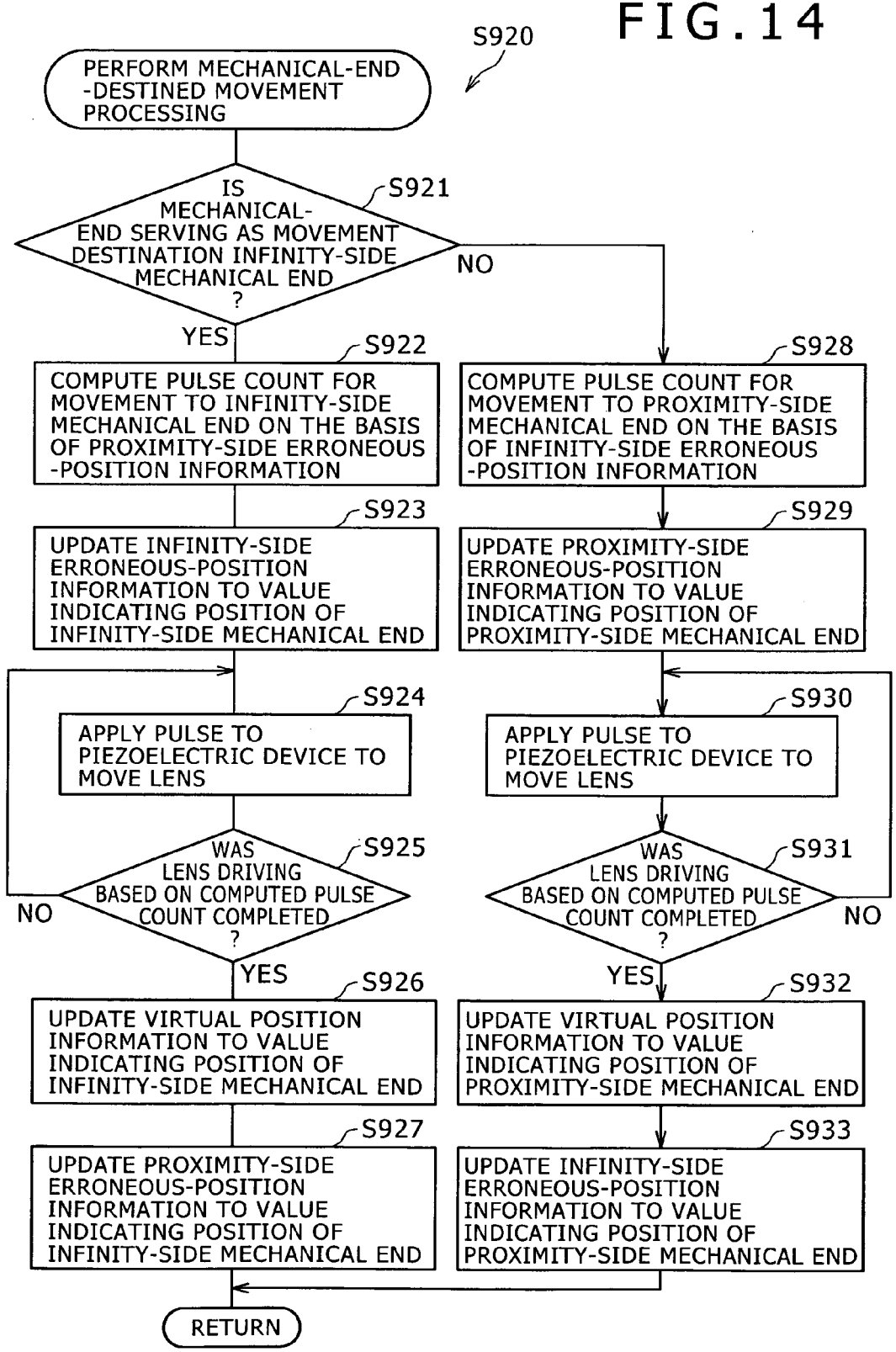
FIG. 14 shows a flowchart representing the procedure of mechanical-end-destined movement processing carried out at a step S920 of the flowchart representing the focus-lens position management processing procedure according to an embodiment of the present disclosure.

FIG. 14 shows a flowchart representing the procedure of the mechanical-end-destined movement processing carried out at the step S920 of the flowchart representing the focus-lens position management processing procedure according to an embodiment of the present disclosure.

The flowchart shown in FIG. 14 begins with a step S921 at which the mechanical-end-destined movement command information computation section 330 determines whether or not the mechanical end serving as the destination of the movement made by the focus lens 220 is the infinity-side mechanical end 242. If the mechanical-end-destined movement command information computation section 330 determines at the step S921 that the mechanical end serving as the destination of the movement made by the focus lens 220 is the infinity-side mechanical end 242, the flow of the procedure goes on to a step S922 at which the pulse count included in the movement command information used for moving the focus lens 220 to the infinity-side mechanical end 242 is computed on the basis of the proximity-side erroneous-position information and the information on errors.

Then, at the next step S923, the value of the infinity-side erroneous-position information is updated to a value indicating the position of the infinity-side mechanical end 242. Subsequently, at the next step S924, the piezoelectric-device driver 211 applies the first one of pulses, the number of which is specified by the pulse count, to the piezoelectric device 212 on the basis of the movement command information supplied from the mechanical-end-destined movement command information computation section 330 as the movement command information including the pulse count so that the piezoelectric device 212 moves the focus lens 220 in the direction toward the infinity-side mechanical end 242. Then, the flow of the procedure goes on to the next step S925 in order to determine whether or not the operation to drive the focus lens 220 on the basis of the pulse count computed at the step S922 as the pulse count of the movement command information has been completed. In order to determine whether or not the operation to drive the focus lens 220 on the basis of the pulse count included in the movement command information has been completed, the piezoelectric-device driver 211 counts the number of pulses applied so far to the piezoelectric device 212 and determines whether or not the number of pulses applied so far to the piezoelectric device 212 has attained the pulse count included in the movement command information. If the operation to drive the focus lens 220 on the basis of the pulse count included in the movement command information is determined at the step S925 to have not been completed, the flow of the procedure goes back to the step S924 in order to apply the next pulse to the piezoelectric device 212 and, then, to the step S925 in order to repeat the determination. As a matter of fact, the processing of the steps S924 and S925 is carried out repeatedly in a state of waiting for the operation to drive the focus lens 220 to be completed. Thus, the focus lens 220 attains the position of the infinity-side mechanical end 242.

As the operation to drive the focus lens 220 on the basis of the pulse count included in the movement command information is determined at the step S925 to have been completed, on the other hand, the flow of the procedure goes on to a step S926 at which the value of the virtual-position information is updated to a value indicating the position of the infinity-side mechanical end 242. Then, at the next step S927, the value of the proximity-side erroneous-position information is updated to the value indicating the position of the infinity-side mechanical end 242.

If the mechanical-end-destined movement command information computation section 330 determines at the step S921 that the mechanical end serving as the destination of the movement made by the focus lens 220 is not the infinity-side mechanical end 242, on the other hand, the flow of the procedure goes on to a step S928 at which the pulse count included in the movement command information used for moving the focus lens 220 to the proximity-side mechanical end 241 is computed on the basis of the infinity-side erroneous-position information.

Then, at the next step S929, the value of the proximity-side erroneous-position information is updated to a value indicating the position of the proximity-side mechanical end 241. Subsequently, at the next step S930, the piezoelectric-device driver 211 applies the first one of pulses, the number of which is specified by the pulse count, to the piezoelectric device 212 on the basis of the movement command information supplied from the mechanical-end-destined movement command information computation section 330 as the movement command information including the pulse count so that the piezoelectric device 212 moves the focus lens 220 in the direction toward the proximity-side mechanical end 241. Then, the flow of the procedure goes on to the next step S931 in order to determine whether or not the operation to drive the focus lens 220 on the basis of the pulse count computed at the step S928 as the pulse count of the movement command information has been completed. In order to determine whether or not the operation to drive the focus lens 220 on the basis of the pulse count included in the movement command information has been completed, the piezoelectric-device driver 211 counts the number of pulses applied so far to the piezoelectric device 212 and determines whether or not the number of pulses applied so far to the piezoelectric device 212 has attained the pulse count included in the movement command information. If the operation to drive the focus lens 220 on the basis of the pulse count included in the movement command information is determined at the step S931 to have not been completed, the flow of the procedure goes back to the step S930 in order to apply the next pulse to the piezoelectric device 212 and, then, to the step S931 in order to repeat the determination. As a matter of fact, the processing of the steps S930 and S931 is carried out repeatedly in a state of waiting for the operation to drive the focus lens 220 to be completed. Thus, the focus lens 220 attains the position of the proximity-side mechanical end 241.

As the operation to drive the focus lens 220 on the basis of the pulse count included in the movement command information is determined at the step S931 to have been completed, on the other hand, the flow of the procedure goes on to a step S932 at which the value of the virtual-position information is updated to a value indicating the position of the proximity-side mechanical end 241. Then, at the next step S933, the value of the infinity-side erroneous-position information is updated to the value indicating the position of the proximity-side mechanical end 241.

As described above, in accordance with the present disclosure, every time the focus lens 220 is moved, the inferred-lens-position information showing the range of the position of the focus lens 220 is updated by considering errors of a movement quantity by which the focus lens 220 is moved. It is thus possible to properly infer the position of the focus lens 220 by taking errors of the movement quantity into consideration without the need to provide a position detection sensor. As a result, in comparison with the related-art imaging apparatus in which movement errors caused by effects of changes in temperature and posture are not taken into consideration, the time it takes to move the focus lens 220 to a mechanical end during manual focus control and autofocus control is short. In addition, information on the position of the focus lens 220 can be managed by taking the changes in temperature and posture into consideration even without providing the position detection sensor, a temperature detection sensor and an acceleration sensor for detecting the changes in posture. Accordingly, it is possible to reduce the size of the lens module and manufacture the lens module at a low cost.

As described above, the embodiments of the present disclosure implement a typical camera module mounted on a portable information terminal. It is to be noted, however, that implementations of the present disclosure are by no means limited to the portable information terminal. For example, the present disclosure can also be applied to a video camera, a digital camera and the like. As an example, in the case of a single-lens reflex camera, a replacement lens holds error information that can be acquired by the body of the camera. Thus, the present disclosure can be applied to such a single-lens reflex camera in the same way as the embodiments described above.

In addition, as described above, the embodiments of the present disclosure manage information on the position of the lens by taking errors of the movement quantity of the lens into consideration. However, an implementation of the present disclosure is not necessarily required to hold all the three pieces of information on positions. That is to say, an implementation of the present disclosure does not have to hold all the virtual-position information, the infinity-side erroneous-position information and the proximity-side erroneous-position information. In the case of a movement to a mechanical end for example, in order to move the lens to the position of the infinity-side mechanical end with absolute certainty, even by making use of only the proximity-side erroneous-position information, the time it takes to bring the lens into contact with the infinity-side mechanical end can be shortened in the same way as the embodiments of the present disclosure.

In addition, in the case of the embodiments of the present disclosure, the focal-point adjustment device functioning as an actuator is assumed to be a piezoelectric device for driving the lens to move between the two mechanical ends. However, implementations of the present disclosure are by no means limited to the embodiments. If a lens is moved by making use of an actuator exhibiting a hysteresis characteristic in the relation between the electric power supplied to the actuator and the driving quantity of the lens in an apparatus, an error is generated in the driving quantity which is also referred to as a movement quantity or a change quantity in this specification or the present disclosure. Thus, in this case, the present disclosure can be applied to the apparatus in the same way as the embodiments described above. For example, the present disclosure can be applied to an apparatus making use of a shape-memory alloy as an actuator for shifting the position of a lens by moving a lens driving shaft into a movement including an expansion and a contraction in the same way as the piezoelectric device.

On top of that, the embodiments of the present disclosure implement an imaging apparatus 100 which adjusts the focus by moving a focus lens 220 in the direction of the actual axis. However, implementations of the present disclosure are by no means limited to the embodiments. For example, if an actuator exhibiting a hysteresis characteristic is used for changing the shape of a lens by displacing a portion of the lens or displacing the entire lens so as to change the optical characteristic of the lens in a configuration for adjusting the focal point, the present disclosure can be applied also to this configuration in the same way as the embodiments. In this configuration, either a liquid lens, a conductive polymer actuator, a polymer resin material or the like is used as the focal-point adjustment device. Also when the actuator changes the shape of the lens, an error is generated between the electric power supplied to the actuator and the shape change of the lens. In this case, the range of possible shape changes of the lens is used as the distance which has been explained earlier by for example referring to FIGS. 4A to 7B as the distance between the mechanical ends in the embodiments. In addition, a range of a shape found on the basis of the electric power supplied to the actuator and the error as the inferred present shape of the lens is used as the range of the inferred position of the focus lens 220 of the embodiments of the present disclosure. A typical example of the range of the inferred position of the focus lens 220 is the lens-position range 435 explained earlier by referring to FIG. 5. Then, in the same way as the embodiments of the present disclosure, the range of the inferred present shape of the lens is updated. The range of the inferred present shape of the lens is also referred to as a range of the lens-shape change quantity. By carrying out such operations, the present disclosure can be implemented in the same way as the embodiments to change the shape of the lens.

In addition, the embodiments of the present disclosure take effects of only the temperature and the posture into consideration. However, implementations of the present disclosure are by no means limited to the embodiments. For example, by computing the magnitudes of errors, the present disclosure can be applied also to a case in which the movement quantity changes due to causes of other factors.

In addition, the error information used in the embodiments of the present disclosure is no more than typical information on errors. For example, in some cases, the changes in temperature, the changes in posture, the maximum change in posture and the minimum change in posture may conceivably vary in the movement direction which can be the direction toward the infinity-side mechanical end or the direction toward the proximity-side mechanical end. For such cases, in an operation to compute a largest movement quantity and a smallest movement quantity, the changes varying in the movement direction are properly selected. Thus, the present disclosure can be implemented in such cases in the same way as the embodiments.

In addition, in the embodiments of the present disclosure, the lens is a focus lens. However, implementations of the present disclosure are by no means limited to the embodiments. For example, the present disclosure can also be applied to a case in which the lens is a zoom lens.

It is to be noted that each of the embodiments of the present disclosure is merely an implementation realizing the present disclosure and, as explained in the description of the embodiments, each item cited in an embodiment of the present disclosure corresponds to a disclosure specific item mentioned in a claim of this specification of the present disclosure. By the same token, each disclosure specific item mentioned in a claim of this specification of the present disclosure corresponds to an item cited in an embodiment of the present disclosure as an item having the same name as the disclosure specific item. However, implementations of the present disclosure are by no means limited to the embodiments. That is to say, in order to implement the present disclosure, each of the embodiments can be further changed to a variety of modified versions within a range not deviating from essentials of the present disclosure.

In addition, each processing procedure according to an embodiment of the present disclosure can be interpreted as a method for carrying out a sequence of processing steps composing the processing procedure. In addition, each sequence of processing steps can be viewed as a program to be executed by a computer to carry out the processing represented by the procedure and a recording medium for storing the program. Typical examples of the recording medium include a CD (Compact Disc), an MD (Mini Disc), a DVD (Digital Versatile Disc), a memory card and a Blu-ray Disc (a registered trademark).

The present disclosure contains subject matter related to that disclosed in Japanese Priority Patent Application JP 2010-246007 filed in the Japan Patent Office on Nov. 2, 2010, the entire content of which is hereby incorporated by reference.

What is claimed is:

1. An imaging apparatus comprising:
   a supplying section configured to supply a driving command for driving at least a portion of a lens in a specific direction to a focal-point adjustment device for changing or adjusting a focal-point distance in accordance with power supplied to said focal-point adjustment device; and
   an inference section configured to infer a position, at which said lens is located after being driven in accordance with said driving command in said specific direction, on the basis of said driving command supplied to said focal-point adjustment device and on the basis of error information serving as information on an error of a driving quantity by which said lens driven by said focal-point adjustment device is moved,
   wherein said inference section infers a predetermined range including the present position of said lens,
   wherein, in order to drive said lens to move to any specific one of the two ends of a driving range of said lens, said supplying section supplies said driving command on the basis of said inferred predetermined range and said error information,
   wherein said error information includes:
   information on errors for a case in which said driving quantity of said lens moving in one driving operation carried out by said focal-point adjustment device is largest; and
   information on errors for a case in which said driving quantity of said lens moving in one driving operation carried out by said focal-point adjustment device is smallest.

2. The imaging apparatus according to claim 1, wherein, with said lens already driven to move to said specific end of said predetermined range, said inference section takes the position of said specific end as the present position of said lens.

3. The imaging apparatus according to claim 1, wherein:
   said supplying section computes a driving quantity, by which said driven lens is to be driven, on the basis of the position of said specific end of said inferred predetermined range and on the basis of a position included in said predetermined range as a position farthest away from said specific end; and
   on the basis of said error information, said supplying section supplies a driving command for said computed driving quantity by taking a driving quantity computed for a case, in which a driving quantity of said lens moving in one driving operation carried out by said focal-point adjustment device is smallest, as a reference.

4. The imaging apparatus according to claim 1, wherein:
   on the basis of said driving command and said error information, said inference section computes
   a first driving quantity defined as the quantity of driving carried out in accordance with said driving command for a case in which said driving quantity of said lens moving in one driving operation carried out by said focal-point adjustment device is largest, and
   a second driving quantity defined as the quantity of driving carried out in accordance with said driving command for a case in which said driving quantity of said lens moving in one driving operation carried out by said focal-point adjustment device is smallest;
   said inference section makes use of
   said computed first driving quantity to update a first end serving as a range limit provided for said predetermined range on a range side relatively close to a destination of said driving according to said driving command, and
   said computed second driving quantity to update a second end serving as a range limit provided for said predetermined range on a range side relatively far away from said destination of said driving according to said driving command; and said inference section infers a new predetermined range generated between said updated first and second ends to include a position at which said lens is located after said lens has been driven in accordance with said driving command.

5. The imaging apparatus according to claim 1, wherein:

said focal-point adjustment device is a piezoelectric device for moving said lens; and said error information includes first information on an error caused by a change in temperature for a case in which said movement quantity of said lens moving in one expansion or contraction operation carried out by said focal-point adjustment device is largest, second information on an error caused by a change in temperature for a case in which said movement quantity of said lens moving in one expansion or contraction operation carried out by said focal-point adjustment device is smallest, third information on an error caused by a change in posture for a case in which said driving quantity of said lens moving in one expansion or contraction operation carried out by said focal-point adjustment device is largest, and fourth information on an error caused by a change in posture for a case in which said driving quantity of said lens moving in one expansion or contraction operation carried out by said focal-point adjustment device is smallest.

6. The imaging apparatus according to claim 5, wherein:

on the basis of said first information, said third information and said driving command, said inference section computes a first driving quantity defined as the quantity of driving carried out in accordance with said driving command for a case in which said driving quantity of said lens moving in one expansion or contraction operation carried out by said focal-point adjustment device is largest;

on the basis of said second information, said fourth information and said driving command, said inference section computes a second driving quantity defined as said quantity of driving carried out in accordance with said driving command for a case in which said driving quantity of said lens moving in one expansion or contraction operation carried out by said focal-point adjustment device is smallest;

said inference section makes use of said computed first driving quantity to update a first end serving as a range limit provided for said predetermined range on a range side relatively close to a destination of said driving according to said driving command;

said inference section makes use of said computed second driving quantity to update a second end serving as a range limit provided for said predetermined range on a range side relatively far away from said destination of said driving according to said driving command; and said inference section infers a new predetermined range generated between said updated first and second ends to include a position at which said lens is located after said lens has been driven in accordance with said driving command.

7. The imaging apparatus according to claim 5, wherein said change in temperature is a change of the temperature of said focal-point adjustment device whereas said change in posture is a change of the posture of said imaging apparatus.

8. The imaging apparatus according to claim 1, wherein said lens is a focus lens.

9. The imaging apparatus according to claim 1, wherein said focal-point adjustment device moves said lens by making use of an increase and a decrease that are caused by repetition of expansion and contraction, which accompany abrupt and gradual changes of electric power supplied to said focal-point adjustment device to move said lens in said specific direction, as respectively an increase and a decrease of a force of friction between a lens driving shaft and said lens brought into contact with said focal-point adjustment device through said lens driving shaft.

10. The imaging apparatus according to claim 1, wherein said focal-point adjustment device changes or adjusts said focal-point distance by moving said lens or changing the shape of said lens.

11. The imaging apparatus according to claim 1, wherein said focal-point adjustment device is either a piezoelectric device or a shape-memory alloy.

12. The imaging apparatus according to claim 1, wherein either a liquid lens, a conductive polymer actuator or a polymer resin material is used as said focal-point adjustment device which changes the shape thereof in accordance with electric power supplied thereto and said focal-point adjustment device changes or adjusts said focal-point distance by changing the shape of said lens.

13. The imaging apparatus according to claim 1, wherein said supplying section supplies said driving command on the basis of a driving quantity by which said lens is to be moved and a driving direction in which said lens is to be moved.

14. An imaging apparatus comprising:

a supplying section configured to supply a driving command for driving at least a portion of a lens in a specific direction to a focal-point adjustment device for changing or adjusting a focal-point distance in accordance with power supplied to said focal-point adjustment device; and an inference section configured to infer a position, at which said lens is located after being driven in accordance with said driving command in said specific direction, on the basis of said driving command supplied to said focal-point adjustment device and on the basis of error information serving as information on an error of a driving quantity by which said lens driven by said focal-point adjustment device is moved, wherein, if said supplying section does not hold information on the position of said lens, said supplying section supplies a driving command capable of driving said lens through the entire distance between the two ends of said driving range of said lens for a case in which said driving quantity of said lens moving in one driving operation carried out by said focal-point adjustment device is smallest.

15. An imaging apparatus comprising:

a supplying section configured to supply a driving command for driving at least a portion of a lens in a specific direction to a focal-point adjustment device for changing or adjusting a focal-point distance in accordance with power supplied to said focal-point adjustment device; and an inference section configured to infer a position, at which said lens is located after being driven in accordance with said driving command in said specific direction, on the basis of said driving command supplied to said focal-point adjustment device and on the basis of error information serving as information on an error of a driving quantity by which said lens driven by said focal-point adjustment device is moved, wherein said position inference section infers the position of said lens from a driving-operation count representing the number of driving operations carried out by said focal-point adjustment device as operations corresponding to a distance from one of the two ends of said driving range of said lens to said position of said lens by taking:

the posture of said imaging apparatus in which said specific direction and a horizontal plane are parallel to each other as a reference posture of said imaging apparatus; and a driving quantity caused by one driving operation carried out by said focal-point adjustment device as a driving quantity of said lens for a case in which the temperature of said focal-point adjustment device is a temperature determined in advance as a reference driving quantity.

16. An imaging method comprising:

supplying a driving command for driving at least a portion of a lens in a specific direction to a focal-point adjustment device for changing or adjusting a focal-point distance in accordance with power supplied to said focal-point adjustment device; and inferring a position, at which said lens is located after being driven in accordance with said driving command in said specific direction, on the basis of said driving command supplied to said focal-point adjustment device and on the basis of error information serving as information on an error of a driving quantity by which said lens driven by said focal-point adjustment device is moved, wherein said error information includes:

information on errors for a case in which said driving quantity of said lens moving in one driving operation carried out by said focal-point adjustment device is largest; and information on errors for a case in which said driving quantity of said lens moving in one driving operation carried out by said focal-point adjustment device is smallest.

17. A non-transitory computer readable medium tangibly embodying computer-executable instructions that when executed by a computer performs steps, the steps comprising:

supplying a driving command for driving at least a portion of a lens in a specific direction to a focal-point adjustment device for changing or adjusting a focal-point distance in accordance with power supplied to said focal-point adjustment device; and inferring a position, at which said lens is located after being driven in accordance with said driving command in said specific direction, on the basis of said driving command supplied to said focal-point adjustment device and on the basis of error information serving as information on an error of a driving quantity by which said lens driven by said focal-point adjustment device is moved, wherein said error information includes:

information on errors for a case in which said driving quantity of said lens moving in one driving operation carried out by said focal-point adjustment device is largest; and information on errors for a case in which said driving quantity of said lens moving in one driving operation carried out by said focal-point adjustment device is smallest.

* * * * *